US012688183B2

(12) United States Patent
Modi et al.

(10) Patent No.: US 12,688,183 B2
(45) Date of Patent: Jul. 21, 2026

(54) EPHEMERAL VIEWS FOR DATABASE QUERY GENERATOR

(71) Applicant: Notion Labs, Inc., San Francisco, CA (US)

(72) Inventors: Abhishek Kishore Modi, San Francisco, CA (US); Simon Townsend-Last, New York, NY (US); Sharabesh Ramesh, New York, NY (US); Theo Morice Bleier, San Francisco, CA (US); Parthiv Shah, San Francisco, CA (US)

(73) Assignee: Notion Labs, Inc., San Francisco, CA (US)

( * ) Notice: Subject to any disclaimer, the term of this patent is extended or adjusted under 35 U.S.C. 154(b) by 0 days.

(21) Appl. No.: 18/827,524

(22) Filed: Sep. 6, 2024

(65) Prior Publication Data

US 2026/0072898 A1     Mar. 12, 2026

(51) Int. Cl.
*G06F 16/242* (2019.01)
*G06F 16/2452* (2019.01)

(52) U.S. Cl.
CPC ...... *G06F 16/2423* (2019.01); *G06F 16/2425* (2019.01); *G06F 16/24522* (2019.01)

(58) Field of Classification Search
CPC ............. G06F 16/2423; G06F 16/2425; G06F 16/24522
See application file for complete search history.

(56) References Cited

U.S. PATENT DOCUMENTS

| | | | |
|---|---|---|---|
| 7,620,615 B1 * | 11/2009 | Milby | G06F 16/24524 |
| 11,687,701 B1 | 6/2023 | Teton-Landis | |
| 12,147,758 B1 * | 11/2024 | Thomas | G06F 40/18 |
| 2005/0262087 A1 * | 11/2005 | Wu | G06F 16/21 |
| | | | 707/999.009 |
| 2018/0239748 A1 * | 8/2018 | Zhang | G06F 3/0482 |
| 2020/0320216 A1 | 10/2020 | Piecko | |

(Continued)

OTHER PUBLICATIONS

Ceriani et al. "SparqlBlocks: Using Blocks to Design Structured Linked Data Queries"; Jul. 2017, http://sparqlblocks.org/, DOI reference No. 10.18293/VLSS2017-011; 21 pages.

(Continued)

*Primary Examiner* — Marc S Somers
(74) *Attorney, Agent, or Firm* — Perkins Coie LLP; Alberto Araiza; Lena Petrovic

(57) ABSTRACT

A system can generate and render, at a computing device, a page comprising a graphical user interface (GUI) that includes a displayable item from a first block of a block-based data structure. The system can use at least a portion of a natural language prompt received by the GUI to cause a neural network (e.g., an LLM) to generate a query executable against the block-based data structure to return a result set comprising a second block. The second block is not initially displayed at the page and can be discoverable by determining query context using at least a portion of the natural language prompt in combination with a property of the first block. The system can cause the generated query to be executed against the block-based data structure to generate and display, at the GUI, (i) an ephemeral view comprising the result set and (ii) a query tuning control configured to enable dynamic tuning of the generated query via the GUI.

20 Claims, 12 Drawing Sheets

(56)                    References Cited

U.S. PATENT DOCUMENTS

| | | | |
|---|---|---|---|
| 2021/0049158 A1* | 2/2021 | Jiao | G06F 16/243 |
| 2022/0036311 A1 | 2/2022 | Didrickson et al. | |
| 2022/0309106 A1* | 9/2022 | Ramos | G06F 16/90332 |
| 2023/0185820 A1* | 6/2023 | Benoit | G06F 16/258 |
| | | | 707/756 |
| 2024/0241880 A1* | 7/2024 | Kislal | G06F 40/35 |
| 2024/0378206 A1 | 11/2024 | Po | |
| 2024/0394287 A1* | 11/2024 | Li | G06F 16/3332 |
| 2025/0173330 A1 | 5/2025 | Durg et al. | |

OTHER PUBLICATIONS

International Search Report and Written Opinion dated Oct. 23, 2025 cited in PCT/US2025/039937, 14 pages.
Ceriani, Miguel, et al. "SparqlBlocks: Using Blocks to Design Structured Linked Data Queries", Jul. 2017, 21 pgs.

\* cited by examiner

600

612

680a

680b

<database-views id="{ID of the parent collectionViewBlock}"> <database-view id="
{viewId of the related database view}" title="{title of the view}" view-id="
{source database}"  database-name=" {database name of the source database}" /> ...
other database views (first 10) </database-view>

630

<load-database id="database-id"/> // returns a child-database/database/link

Figure 6B:
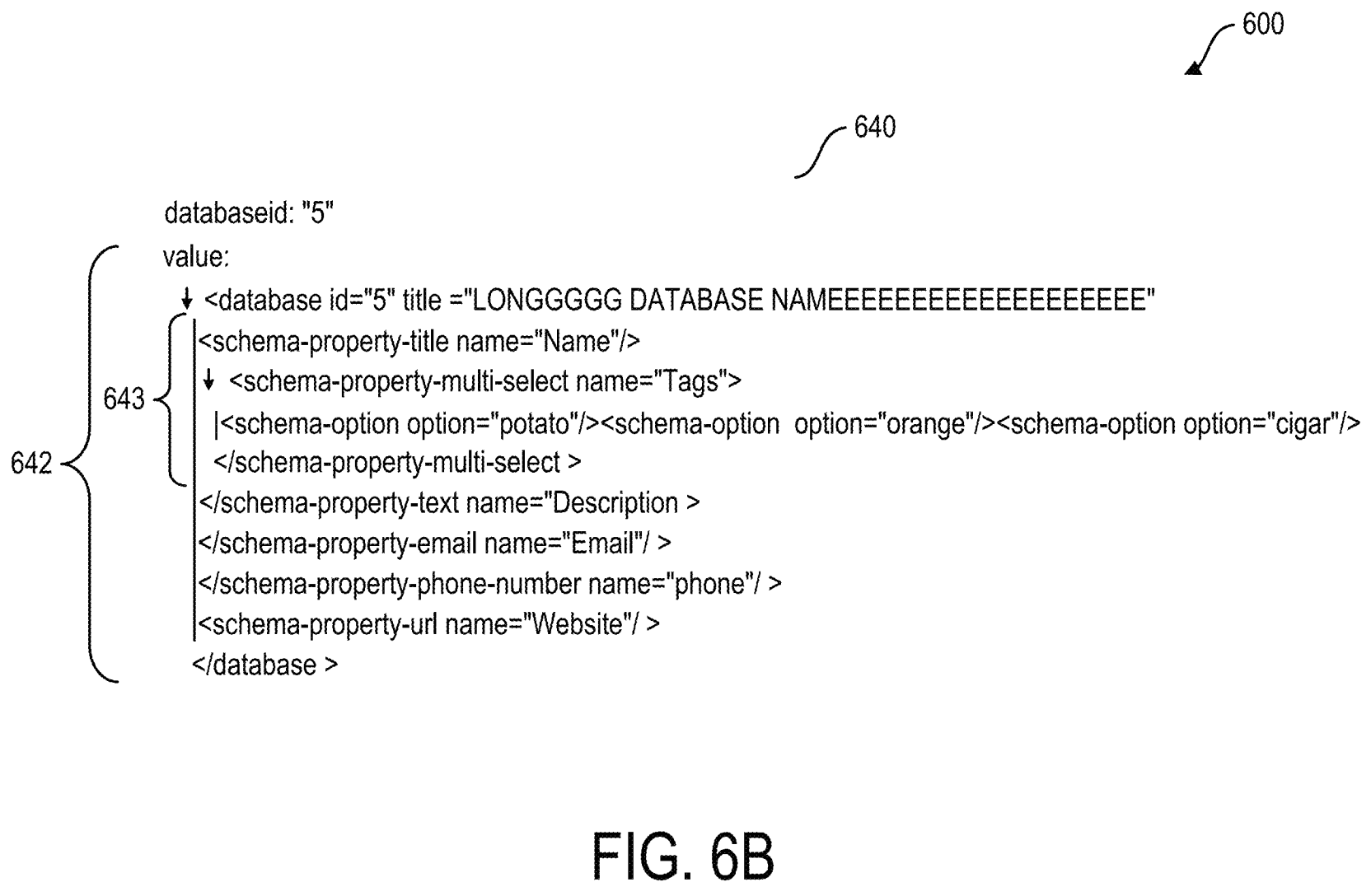

600

640

```
databaseid: "5"
value:
    →  <database id="5" title ="LONGGGGG DATABASE NAMEEEEEEEEEEEEEEEEE"
        <schema-property-title name="Name"/>
    →   <schema-property-multi-select name="Tags">
        |<schema-option option="potato"/><schema-option  option="orange"/><schema-option option="cigar"/>
        </schema-property-multi-select >
        </schema-property-text name="Description >
        </schema-property-email name="Email"/ >
        </schema-property-phone-number name="phone"/ >
        <schema-property-url name="Website"/ >
        </database >
```

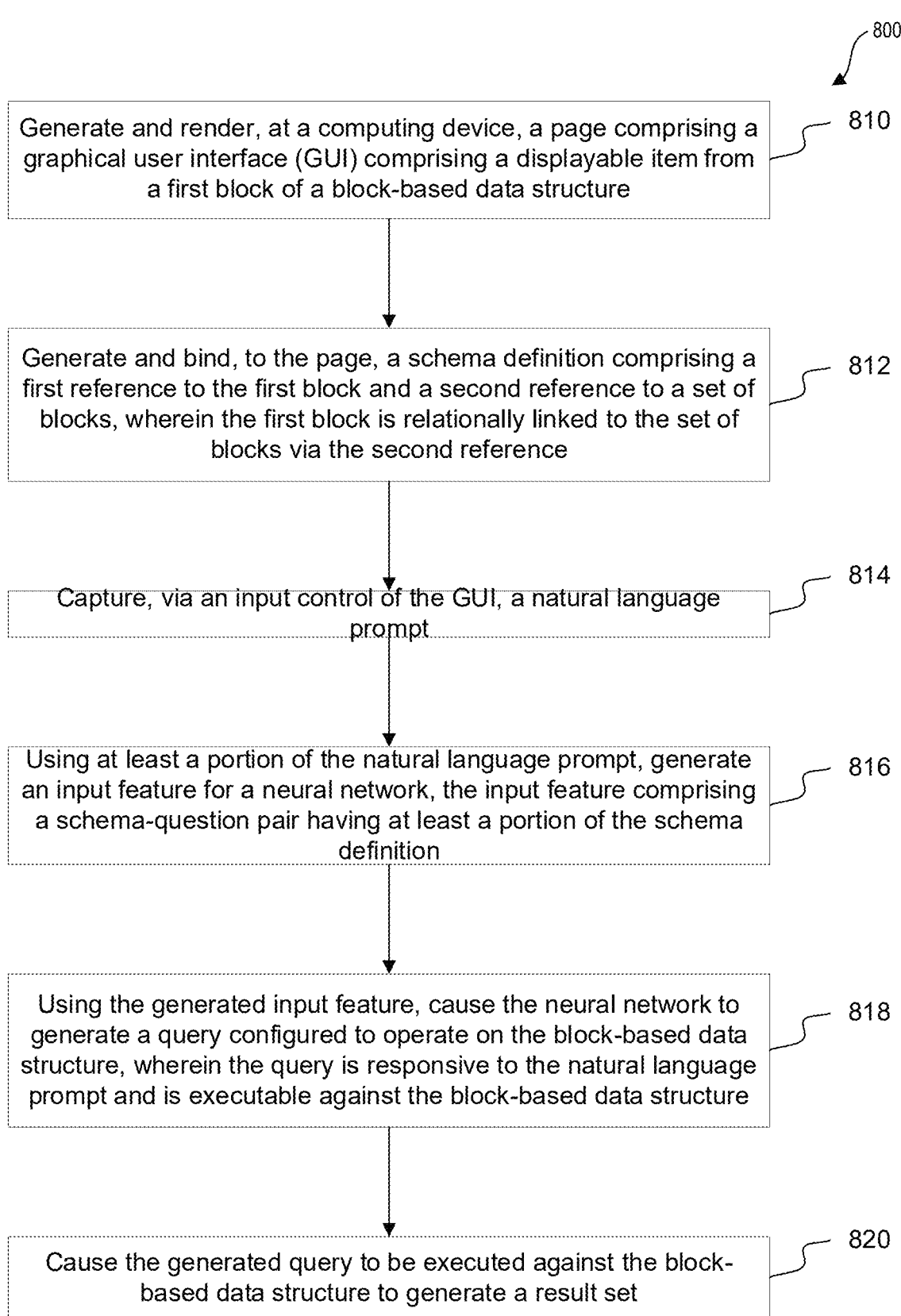

800

Generate and render, at a computing device, a page comprising a graphical user interface (GUI) comprising a displayable item from a first block of a block-based data structure — 810

Generate and bind, to the page, a schema definition comprising a first reference to the first block and a second reference to a set of blocks, wherein the first block is relationally linked to the set of blocks via the second reference — 812

Capture, via an input control of the GUI, a natural language prompt — 814

Using at least a portion of the natural language prompt, generate an input feature for a neural network, the input feature comprising a schema-question pair having at least a portion of the schema definition — 816

Using the generated input feature, cause the neural network to generate a query configured to operate on the block-based data structure, wherein the query is responsive to the natural language prompt and is executable against the block-based data structure — 818

Cause the generated query to be executed against the block-based data structure to generate a result set — 820

FIG. 8A

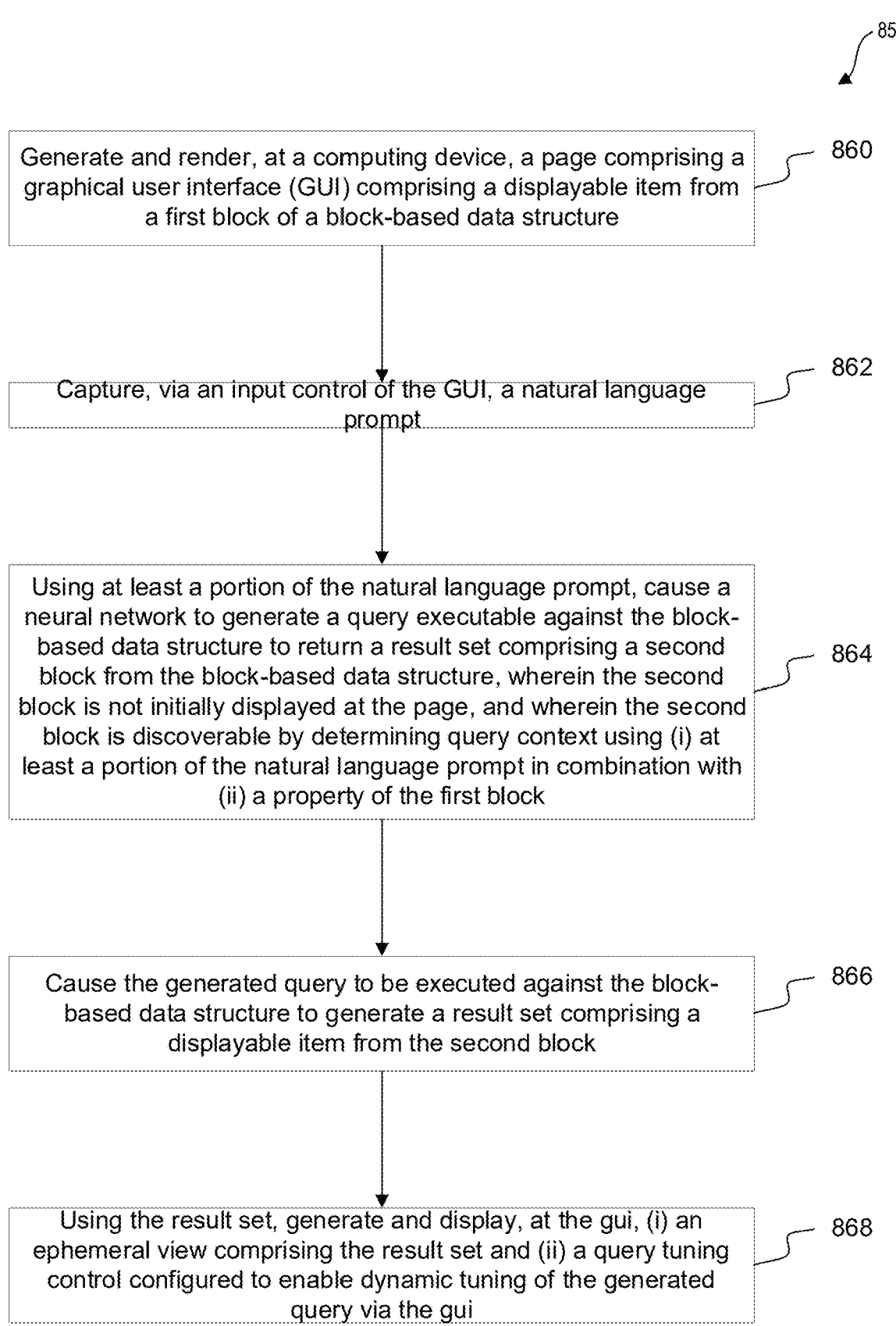

850

Generate and render, at a computing device, a page comprising a graphical user interface (GUI) comprising a displayable item from a first block of a block-based data structure — 860

Capture, via an input control of the GUI, a natural language prompt — 862

Using at least a portion of the natural language prompt, cause a neural network to generate a query executable against the block-based data structure to return a result set comprising a second block from the block-based data structure, wherein the second block is not initially displayed at the page, and wherein the second block is discoverable by determining query context using (i) at least a portion of the natural language prompt in combination with (ii) a property of the first block — 864

Cause the generated query to be executed against the block-based data structure to generate a result set comprising a displayable item from the second block — 866

Using the result set, generate and display, at the gui, (i) an ephemeral view comprising the result set and (ii) a query tuning control configured to enable dynamic tuning of the generated query via the gui — 868

EPHEMERAL VIEWS FOR DATABASE QUERY GENERATOR

BACKGROUND

Project and/or document management systems enable teams to organize work and can be used for workflow automation, task management, project planning, and file sharing. Many industries are turning to artificial intelligence (AI) tools to automate project and document management tasks that previously required significant human labor or were infeasible or impossible for humans to perform. However, despite advancement of AI tools, integrating AI tools into systems that manage multimodal data and have flexible data structures has proven challenging. Conventional AI tools, for example, may lack the capacity to autonomously comprehend and navigate structured environments and accurately retrieve information requested via natural language prompts. Prompt engineering is a discipline that offers techniques to tune user prompts in a way that increases prompt utility. However, prompt engineering techniques have limited capacity when a prompt includes a natural language question about data stored in a database whose structure is unknown to the prompt engineering component or may have changed since it was last known.

BRIEF DESCRIPTION OF THE DRAWINGS

Reference will now be made, by way of example, to the accompanying drawings, which show example embodiments of the present application and in which:

FIG. 6B is an example markup-language definition of a dynamically constructed query executable against the dynamic data structure, according to some arrangements.

FIG. 8A is a flowchart showing an example method of the query engine to generate queries against dynamic data structures of the platform, according to some arrangements.

FIG. 8B is a flowchart showing an example method of the query engine to generate and manage ephemeral views, according to some arrangements.

Figure 1:
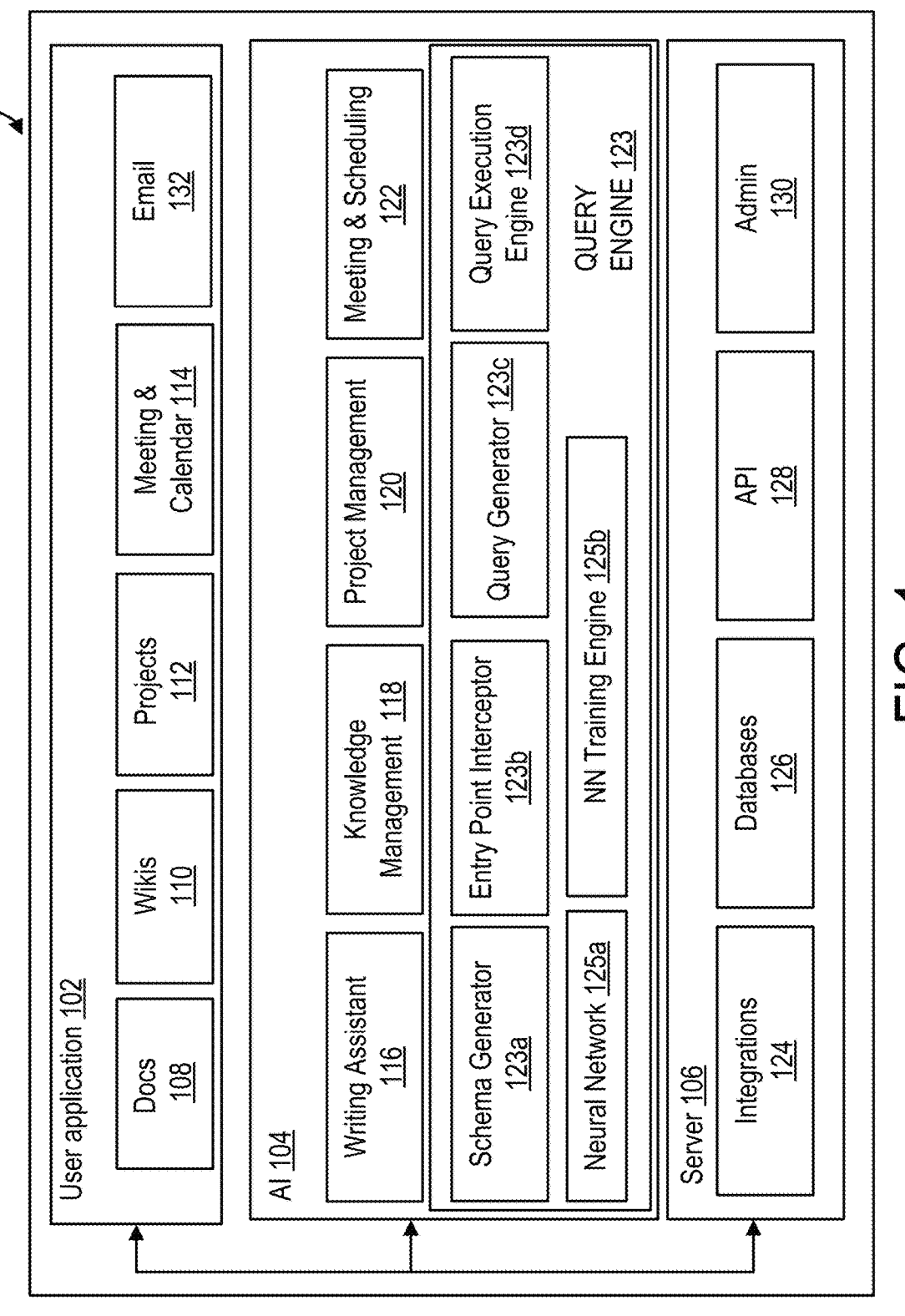
FIG. 1 is a block diagram illustrating a platform, which may be used to implement examples of the present disclosure.

The technologies described herein will become more apparent to those skilled in the art by studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

A technical problem with AI models trained to generate ad hoc queries based on natural language inputs is a high compute load for the AI models to identify appropriate schema elements to query. For example, an AI model that generates queries might be provided with a copy of a large database schema, and the AI model might learn about relations between objects in the schema to answer ad hoc, free-form questions. Even with appropriate training, the AI model used to generate queries for such a schema can experience high compute load and memory utilization needed to traverse large schemas to answer questions. Also, AI models, even if trained, can, in certain circumstances, quickly experience model drift (decay of a model's predictive power as a result of changes in real-world environments) if the schema constantly evolves, with new attributes or content being added.

One way to solve this technical problem is through continuous incremental training and tuning of AI models that generate queries using natural language input. However, unforeseen use cases can generate exceptions at least once before they are identified and used to tune the model. Another technique to solve this technical problem can involve prompt engineering—for example, specifying data sources to query in the question posed by the user. However, this technique can limit users from asking free-form and truly ad hoc questions with respect to constantly evolving database schemas.

The technology disclosed herein is directed to solving these technical problems. The disclosed technology includes improved systems, methods, and computer-readable media for a query engine that can automatically discover schemas in evolving, block-based structures. The query engine can construct and execute user-modifiable queries against dynamic data structures that underlie the discovered schemas, even in scenarios where the scope of a particular natural language question goes beyond current context (e.g., beyond the schema elements rendered at a particular point in time via a particular GUI).

The block-based data structures (sometimes referred to as "data structures," for simplicity) of the platform disclosed herein can be flexibly composed of blocks (e.g., can include a set of blocks), which can be linked in associative and/or hierarchical fashion to form pages. Collections of pages, similarly linked in associative and/or hierarchical fashion, can compose databases. Blocks can include properties, which can be textual, numerical, graphical, and/or mixed-type attributes, and can be utilized to link the blocks. The blocks can be utilized for storage of linked multimodal content. Multimodal content refers to content items of different types (e.g., text, images, video, audio, multimedia), where the items can be related. For example, a particular conceptual unit of multimodal content can include a project plan, meeting notes, to-do lists, project budgets, stakeholder interview recordings (e.g., in audio and/or video form), and/or user-interactive multimedia training files. Items in a particular unit of multimodal content can have a variety of provenances. For example, stored items (schema content) can include imported items, human-generated items, machine learning (ML) generated items, and/or artificial intelligence (AI) generated items. Multimodal content is typically difficult to organize and search, in a unified manner, by using a single search instruction across modalities.

The technology disclosed herein enables automatic, AI-assisted generation of queries against discovered schemas in dynamic, block-based structures. The queries can be constructed based on natural language input, such as a prompt received via a chat interface. Query result sets can be presented via user-modifiable ephemeral views. To enable automatic data discovery, the platform can generate, and bind to GUIs of the platform, markup-language (e.g., XML) and/or key-value pair (e.g., JSON) schemas that correspond to various database structures and objects in the block-based ecosystem. Such schema definitions, described in detail throughout this disclosure, enable a technical advantage of abstracting the underlying block-based data structure and exposing a minimum set of elements sufficient to discover schema objects to which access is permissible given current context and/or user access restrictions.

Furthermore, because certain elements of the schema definitions can be implemented as references rather than copies of data, an additional technical advantage, in certain implementations, is minimization of compute resources needed to generate quality input features sufficient for trained neural networks (e.g., LLMs) to become aware of schema objects to query. In such implementations, neither the input feature-generating executables nor the AI models that generate queries are always expected to access and traverse the entire data universe. The reference-based structure of schema definitions minimizes out-of-synch scenarios as schemas continue to evolve, with attributes or content being modified, added, or deleted. Because such efficiently structured schema definitions can be identified prior to model execution and included in input features for AI models that generate queries, the decreased execution time and increased quality of output of the AI models can be achieved without the tradeoff of losing data structure flexibility.

In certain implementations, to discover schema elements and generate input features for the AI models that generate queries, the platform can generate schema-question pairs. A particular schema-question pair can include a reference to a set of objects in a schema (e.g., database, table, page, block, property) and a set of questions to elicit a search. Using the input features, the platform can discover or construct (e.g., by joining objects) aspects of a database schema to query in order to answer a particular question. The platform can do so by automatically discovering blocks and properties substantially contemporaneously with context (e.g., schema definitions from page metadata) being generated or refreshed. Accordingly, when new properties are added to blocks or when properties are used to form new associations between blocks, the AI models can utilize the pointers and property identifiers in context metadata to identify appropriate elements that define the structure and relations in the underlying database—in certain cases, even without refreshing the context metadata.

To capture user questions, a GUI can be provided at a computing device. The GUI can include a chatbot (e.g., an AI assistant bot, a question-and-answer (Q&A) assistant prompt) that enables users to interact with the platform using natural language questions or commands. The query engine of the platform can parse the natural language questions into constituent elements. The neural network (e.g., an LLM) or another AI model can use the natural language questions and/or their constituent elements along with discoverable object identifiers from the page metadata. The neural network or another AI model can generate outputs (predictions) that include suggested query strings and/or elements thereof.

Upon execution of the query strings generated by the neural network (e.g., an LLM) or another AI model, the platform can generate and display one or more ephemeral views, which can include drill-down controls to enable visibility and interaction with the returned result sets. Items in a particular ephemeral view can be associated with automatically generated citation objects, which can visualize the database items within a result set. Furthermore, in various use cases, ephemeral views can include controls that enable users to dynamically tune AI-generated queries (e.g., by specifying additional query parameters and/or by modifying automatically generated query parameters). Ephemeral views and their modifications can be persisted to enable explainability of AI models in the query generation process.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Block Data Model

The disclosed technology includes a block data model ("block model"). The blocks are dynamic units of information that can be transformed into other block types and move across workspaces. The block model allows users to customize how their information is moved, organized, and shared. Hence, blocks contain information but are not siloed.

Blocks are singular pieces that represent all units of information inside an editor. In one example, text, images, lists, a row in a database, etc., are all blocks in a workspace. The attributes of a block determine how that information is rendered and organized. Every block can have attributes including an identifier (ID), properties, and type. Each block is uniquely identifiable by its ID. The properties can include a data structure containing custom attributes (e.g., descriptors) about a specific block. An example of a property is "title," which stores text content of block types such as paragraphs, lists, and the title of a page. More elaborate block types require additional or different properties, such as a page block in a database with user-defined properties. Every block can have a type, which defines how a block is displayed and how the block's properties are interpreted.

Block properties can function similarly to foreign keys in relational database structure. For example, an "authorized reviewer" property of a document block can include a set of block IDs that point to blocks that store information about system users. Accordingly, a block can have attributes that define its relationship with other blocks. For example, the attribute "content" is an array (or ordered set) of block IDs representing the content inside a block, such as nested bullet items in a bulleted list or the text inside a toggle. The attribute "parent" is the block ID of a block's parent, which can be used for permissions. Blocks can be combined with other blocks to track progress and hold all project information in one place.

A block type specifies how the block is rendered in a user interface (UI), and the block's properties and content are interpreted differently depending on that type. Changing the type of a block does not change the block's properties or content—it only changes the type attribute. The information is thus rendered differently or even ignored if the property is not used by that block type. Decoupling property storage from block type allows for efficient transformation and changes to rendering logic and is useful for collaboration.

Blocks can be nested inside of other blocks (e.g., infinitely nested subpages inside of pages). The content attribute of a block stores the array of block IDs (or pointers) referencing those nested blocks. Each block defines the position and order in which its content blocks are rendered. This hierarchical relationship between blocks and their render children is referred to herein as a "render tree." In one example, page blocks display their content in a new page, instead of rendering it indented in the current page. To see this content, a user would need to click into the new page.

In the block model, indentation is structural (e.g., reflects the structure of the render tree). In other words, when a user indents something, the user is manipulating relationships between blocks and their content, not just adding a style. For example, pressing Indent in a content block can add that block to the content of the nearest sibling block in the content tree.

Blocks can inherit permissions of blocks in which they are located (which are above them in the tree). Consider a page: to read its contents, a user must be able to read the blocks within that page. However, there are two reasons one cannot use the content array to build the permissions system. First, blocks are allowed to be referenced by multiple content arrays to simplify collaboration and a concurrency model. But because a block can be referenced in multiple places, it is ambiguous which block it would inherit permissions from. The second reason is mechanical. To implement permission checks for a block, one needs to look up the tree, getting that block's ancestors all the way up to the root of the tree (which is the workspace). Trying to find this ancestor path by searching through all blocks'content arrays is inefficient, especially on the client. Instead, the model uses an "upward pointer"—the parent attribute—for the permission system. The upward parent pointers and the downward content pointers mirror each other.

A block's life starts on the client. When a user takes an action in the interface—typing in the editor, dragging blocks around a page—these changes are expressed as operations that create or update a single record. The "records" refer to persisted data, such as blocks, users, workspaces, etc. Because many actions usually change more than one record, operations are batched into transactions that are committed (or rejected) by the server as a group.

Creating and updating blocks can be performed by, for example, pressing Enter on a keyboard. First, the client defines all the initial attributes of the block, generating a new unique ID, setting the appropriate block type (to_do), and filling in the block's properties (an empty title, and checked: [["No"]]). The client builds operations to represent the creation of a new block with those attributes. New blocks are not created in isolation: blocks or pointers thereto are also added to their parent's content array so that they are in the correct position in the content tree. As such, the client also generates an operation to do so. All these individual change operations are grouped into a transaction. Then, the client applies the operations in the transaction to its local state. New block objects are created in memory and existing blocks are modified. In native apps, the model caches all records that are accessed locally in an LRU (least recently used) cache on top of SQLite or IndexedDB, referred to as RecordCache. When records are changed on a native app, the model also updates the local copies in RecordCache. The editor re-renders to draw the newly created block onto the display. At the same time, the transaction is saved into TransactionQueue, the part of the client responsible for sending all transactions to the model's servers so that the data is persisted and shared with collaborators. Transaction-Queue stores transactions safely in IndexedDB or SQLite (depending on the platform) until they are persisted by the server or rejected.

A block can be saved on a server to be shared with others. Usually, TransactionQueue sits empty, so the transaction to create the block is sent to the server in an application programming interface (API) request. In one example, the transaction data is serialized to JSON and posted to the /saveTransactions API endpoint. Save Transactions gets the data into source-of-truth databases, which store all block data as well as other kinds of persisted records. Once the request reaches the API server, all the blocks and parents involved in the transaction are loaded. This gives a "before" picture in memory. The block model duplicates the "before" data that had just been loaded in memory. Next, the block model applies the operations in the transaction to the new copy to create the "after" data. Then the model uses both "before" and "after" data to validate the changes for permissions and data coherency. If everything checks out, all created or changed records are committed to the database—meaning the block has now officially been created. At this point, a "success" HTTP response to the original API request is sent by the client. This confirms that the client knows the transaction was saved successfully and that it can move on to saving the next transaction in the TransactionQueue. In the background, the block model schedules additional work depending on the kind of change made for the transaction. For example, the block model can schedule version history snapshots and indexing block text for a Quick Find function. The block model also notifies MessageStore, which is a real-time updates service, about the changes that were made.

The block model provides real-time updates to, for example, almost instantaneously show new blocks to members of a teamspace. Every client can have a long-lived WebSocket connection to the MessageStore. When the client renders a block (or page, or any other kind of record), the client subscribes to changes of that record from Message-Store using the WebSocket connection. When a team member opens the same page, the member is subscribed to changes of all those blocks. After changes have been made through the saveTransactions process, the API notifies MessageStore of new recorded versions. MessageStore finds client connections subscribed to those changing records and passes on the new version through their WebSocket connection. When a team member's client receives version update notifications from MessageStore, it verifies that version of the block in its local cache. Because the versions from the notification and the local block are different, the client sends a syncRecordValues API request to the server with the list of outdated client records. The server responds with the new record data. The client uses this response data to update the local cache with the new version of the records, then re-renders the user interface to display the latest block data.

Blocks can be shared instantaneously with collaborators. In one example, a page is loaded using only local data. On the web, block data is pulled from being in memory. On native apps, loading blocks that are not in memory are loaded from the RecordCache persisted storage. However, if missing block data is needed, the data is requested from an API. The API method for loading the data for a page is referred to herein as loadPageChunk; it descends from a starting point (likely the block ID of a page block) down the content tree and returns the blocks in the content tree plus any dependent records needed to properly render those blocks. Several layers of caching for loadPageChunk are used, but in the worst case, this API might need to make multiple trips to the database as it recursively crawls down the tree to find blocks and their record dependencies. All data loaded by loadPageChunk is put into memory (and saved in the RecordCache if using the app). Once the data is in memory, the page is laid out and rendered using React.

Software Platform

FIG. 1 is a block diagram of an example platform 100. The platform 100 provides users with an all-in-one workspace for data and project management. The platform 100 can include a user application 102, an AI tool 104, and a server 106. The user application 102, the AI tool 104, and the server 106 are in communication with each other via a network.

In some implementations, the user application 102 is a cross-platform software application configured to work on several computing platforms and web browsers. The user application 102 can include a variety of templates. A template refers to a prebuilt page that a user can add to a workspace within the user application 102. The templates can be directed to a variety of functions. Exemplary templates include a docs template 108, a wikis template 110, a projects template 112, a meeting and calendar template 114, and an email template 132. In some implementations, a user can generate, save, and share customized templates with other users.

The user application 102 templates can be based on content "blocks." For example, the templates of the user application 102 include a predefined and/or pre-organized set of blocks that can be customized by the user. Blocks are content containers within a template that can include text, images, objects, tables, maps, emails, and/or other pages (e.g., nested pages or subpages). Blocks can be assigned certain properties. The blocks are defined by boundaries having dimensions. The boundaries can be visible or non-visible for users. For example, a block can be assigned as a text block (e.g., a block including text content), a heading block (e.g., a block including a heading), or a subheading block having a specific location and style to assist in organizing a page. A block can be assigned as a list block to include content in a list format. A block can be assigned as an AI prompt block (also referred to as a "prompt block") that enables a user to provide instructions (e.g., prompts) to the AI tool 104 to perform functions. A block can also be assigned to include audio, video, and/or image content.

A user can add content to, edit, and remove content from the blocks. The user can also organize the content within a page by moving the blocks around. In some implementations, the blocks are shared (e.g., by copying and pasting) between the different templates within a workspace. For example, a block embedded within multiple templates can be configured to show edits synchronously.

The docs template 108 is a document generation and organization tool that can be used for generating a variety of documents. For example, the docs template 108 can be used to generate pages that are easy to organize, navigate, and format. The wikis template 110 is a knowledge management application that has features similar to the pages generated by the docs template 108 but that can additionally be used as a database. The wikis template 110 can, for example, include tags configured to categorize pages by topic and/or include an indication of whether the provided information is verified to indicate its accuracy and reliability. The projects template 112 is a project management and note-taking software tool. The projects template 112 can allow the users, either as individuals or as teams, to plan, manage, and execute projects in a single forum. The meeting and calendar template 114 is a tool for managing tasks and timelines. In addition to traditional calendar features, the meeting and calendar template 114 can include blocks for categorizing and prioritizing scheduled tasks, generating to-do and action item lists, tracking productivity, etc. The various templates of the user application 102 can be included under a single workspace and include synchronized blocks. For example, a user can update a project deadline on the projects template 112, which can be automatically synchronized to the meeting and calendar template 114. The various templates of the user application 102 can be shared within a team, allowing multiple users to modify and update the workspace concurrently.

The email template 132 allows users to customize their inbox by representing the inbox as a customizable database where the user can add custom columns and create custom views with layouts. One view can include multiple layouts including a calendar layout, a summary layout, and urgent information layout. Each view can include a customized structure including custom criteria, custom properties, and custom actions. The custom properties can be specific to a view such as artificial intelligence-extracted properties, and/or heuristic-based properties. The custom actions can trigger automatically when a message enters the view. The custom actions can include deterministic rules such as "Archive this," or assistant workflows such as responding to support messages by searching user applications 102 or filing support tickets. In addition, the view can include actions, such as buttons, that are custom to the view and perform operations on the messages in the inbox. In some implementations, only the customized structure can be shared with other users of the system. In some implementations, both the customized structure and the messages can be shared.

The AI tool 104 is an integrated AI assistant that enables AI-based functions for the user application 102. In one example, the AI tool 104 is based on a neural network (e.g., an LLM) architecture, such as the transformer 212 described in reference to FIG. 2. Accordingly, the AI tool 104 can include one or more instances of a neural network 125a, which can include model-related data stores, parameter stores, executables, API files, and so forth (collectively referred to as a "model framework"). The neural network 125a can be interfaced with a neural network training engine 125b.

The AI tool 104 can interact with blocks embedded within the templates on a workspace of the user application 102. For example, the AI tool 104 can include a writing assistant tool 116, a knowledge management tool 118, a project management tool 120, and/or a meeting and scheduling tool 122. The different tools of the AI tool 104 can be interconnected and interact with different blocks and templates of the user application 102.

The writing assistant tool 116 can operate as a generative AI tool for creating content for the blocks in accordance with instructions received from a user. Creating the content can include, for example, summarizing, generating new text, or brainstorming ideas. For example, in response to a prompt received as a user input that instructs the AI to describe what the climate is like in New York, the writing assistant tool 116 can generate a block including a text that describes the climate in New York. As another example, in response to a prompt that requests ideas on how to name a pet, the writing assistant tool 116 can generate a block including a list of creative pet names. The writing assistant tool 116 can also operate to modify existing text. For example, the writing assistant tool 116 can shorten, lengthen, or translate existing text, correct grammar and typographical errors, or modify the style of the text (e.g., a social media style versus a formal style).

The knowledge management tool 118 can use AI to categorize, organize, and share knowledge included in the workspace. In some implementations, the knowledge management tool 118 can operate as a question-and-answer assistant. For example, a user can provide instructions on a prompt block to ask a question. In response to receiving the question, the knowledge management tool 118 can provide an answer to the question, for example, based on information included in the wikis template 110 or, more generally, by searching blocks that the requestor has permission to access.

The project management tool 120 can provide AI support for the projects template 112. The AI support can include autofilling information based on changes within the workspace or automatically tracking project development. For example, the project management tool 120 can use AI for task automation, data analysis, real-time monitoring of project development, allocation of resources, and/or risk mitigation.

The meeting and scheduling tool 122 can use AI to organize meeting notes, unify meeting records, list key information from meeting minutes, and/or connect meeting notes with deliverable deadlines.

The AI tool 104 can include a query engine 123 that can construct and execute user-modifiable queries against discovered, dynamic data structures. The query engine 123 can include a schema generator 123a, an entry point interceptor 123b, an AI/ML-based query generator 123c, and/or a query execution engine 123d.

The schema generator 123a can generate units of page metadata or items associated with rendered pages. Such metadata can describe page context: schemas to which a particular page has access. An example schema can include identifiers or references to databases and/or database views. The databases or database views can be thought of as collections of blocks to which a logged-in user and/or the rendered page have access (e.g., read, modify) permissions. The page metadata can be generated in response to detecting a page load event and can be dynamically updated to enable transaction integrity in a multi-user environment (for example, using the MessageStore streams accessed via the WebSocket connection to detect changes or deletions of databases or views). In some implementations, the page metadata can include references to objects (blocks, databases, views) rather than, or in addition to, actual data values. This approach can minimize compute load on the client to intercept and update the page metadata using streams of updated data. That is, units of page metadata can remain stable because they can include pointers to stored data values rather than the stored data values themselves.

The entry point interceptor 123b can include one or more executables associated with the rendered page. An example executable can detect when a user enters a question, which can be in the form of a natural language prompt, also sometimes referred to as a natural language command set or a natural language instruction set. In some implementations, the entry point interceptor 123b can include a GUI delivered to the client via a user application 102, and the prompt can be received via an input control displayed at the GUI (e.g., a textbox, a prompt block). In some implementations, the entry point interceptor 123b can include or be communicatively coupled to a voice capture device (e.g., a voice-activated assistant, a microphone) that can capture the prompt in auditory form. The entry point interceptor 123b can include a transcription module that converts the auditory-form prompt to text form.

The entry point interceptor 123b can parse the user-entered prompt to extract or determine prompt elements. Prompt elements can include, for example, an instruction, a context, input data, and/or an output specification. For instance, using a natural language prompt "please provide all recent images of a bear on a bicycle for a children's book illustration," the entry point interceptor 123b could interpret "provide," "all," and "recent" as instructions, "images" as an output specification, "bear on a bicycle" as relevant input data (e.g., knowledge acquired by an AI model via prior training), and "children's book illustration" as context. The entry point interceptor 123b could further pre-process the parsed term "provide" by, for example, cross-referencing it to an ontology of actionable instructions. The ontology of actionable instructions could be further refined based on the additional instructions in the prompt, such as "recent." For instance, if the term "provide" maps in an ontology to both "retrieve" and "generate," the entry point interceptor 123b could discard the instruction "generate" by determining that the instruction "recent"refers to previously generated items.

The entry point interceptor 123b can generate a set of input features for the AI/ML-based query generator 123c. For example, the entry point interceptor 123b can generate schema-question pairs. A particular schema-question pair can include, at least in part, page metadata and prompt elements (instructions, context, input data, and/or output specifications).

The entry point interceptor 123b can provide schema-question pairs to a downstream system or module, such as the AI/ML-based query generator 123c. The AI/ML-based query generator 123c can use the input features to discover the appropriate schema and automatically generate computer-readable and/or computer-executable code, such as a query. For instance, based on the page metadata included in the schema-question pair, where the metadata specifies discoverable dynamic data structures, the AI/ML-based query generator 123c can determine the target database, page, block, and/or teamspace to query and/or determine relations between multiples of these objects.

Continuing the example involving bears on bicycles, the AI/ML-based query generator 123c can include a neural network 125a. The neural network 125a can be trained (e.g., using the neural network training engine 125b) to determine that images (.jpg, .gif) reside in a particular database or collection of linked blocks (e.g., page) identified as "IMAGES" and construct at least a portion of the query to search the database or collection of linked blocks titled "IMAGES" for vectorized representation of the content. As another example, if a user "writer" who submitted the request for images that include bears on bicycles has permission to access a particular database titled "STOCK ILLUSTRATIONS," the AI/ML-based query generator 123c can set the target database or collection of linked blocks in the automatically generated query string to "STOCK ILLUSTRATIONS."

Furthermore, items in databases or collections of linked blocks can include properties that denote item categories to facilitate retrieval of data and minimize the size of the retrieved dataset. In such cases, the AI/ML-based query generator 123c can generate rules (e.g., filters, query condition clauses such as "where," "having," and so forth) for data retrieval. For example, the AI/ML-based query generator 123c can apply the neural network 125a to determine the category associated with "bear" and/or "bicycle" prior to generating a query. For instance, assuming the AI model returns a classifier "animals" for "bear," and assuming that the database "STOCK ILLUSTRATIONS" includes a property labeled "animals," the AI/ML-based query generator 123c can construct its query (e.g., by generating the "property" portion of the query, the "where" portion of the query, or another syntactical element) to consider only the items in "STOCK ILLUSTRATIONS" where the property value equals "animals."

In some implementations, the AI/ML-based query generator 123c can generate API calls instead of or in addition to database queries. For instance, the AI/ML-based query generator 123c can determine a target database 126, determine a particular integrations unit 124 that defines a set of API 128 calls, and automatically generate and execute the appropriate API 128 calls against the database 126.

The query execution engine 123d can execute the queries and/or API calls generated by the AI/ML-based query generator 123c. To that end, the query execution engine 123d can receive or generate result sets, generate ephemeral views, enable users to tune ephemeral views and the underlying automatically generated queries, and so forth. Additionally, the query execution engine 123d can initiate and manage communication sessions between the AI/ML-based query generator 123c and various other components of the ecosystem, maintain request and response statuses, manage call timeouts, and so forth.

In some implementations, the query execution engine 123d can generate and/or execute semantic reasoner logic to enable the query engine 123 to increase precision in response to sophisticated user questions. In addition to schema identification and use of query syntax elements (e.g., "where," "having," and similar clauses), certain natural language questions may call for semantic analysis of block content or items referenced by a block. For example, a question "What are the most common topics addressed by our organization's information governance [IG] policies?" can call for performing an extractive summary, semantic search, a combination thereof, or other suitable operations on policy documents stored in blocks identified by page metadata. Following extractive summarization and semantic search, an example response can be "the top three topics in our IG policies are cybersecurity, data integrity, and safeguarding customer privacy."

Additionally or alternatively, the query execution engine 123d can raise and handle exceptions based on certain types of output by the neural network 125a. For example, the output of the neural network 125a can indicate that a user question cannot be answered. In some implementations the query execution engine 123d can automatically parse and/or process the output of the neural network 125a and/or perform additional operations to determine reasons the question cannot be answered, such as insufficiency of page metadata, lack of user permissions to access responsive blocks, and/or lack of schema elements, data, or both to answer a particular question.

Further with respect to elements of the platform 100, the server 106 can include various units (e.g., compute and storage units) that enable the operations of the AI tool 104 and workspaces of the user application 102. The server 106 can include an integrations unit 124, databases 126, an API 128, and an administration (admin) unit 130. The databases 126 are configured to store data associated with the blocks. The data associated with the blocks can include information about the content included in the blocks, the function associated with the blocks, and/or any other information related to the blocks. The API 128 can be configured to communicate the block data between the user application 102, the AI tool 104, and the databases 126. The API 128 can also be configured to communicate with remote server systems, such as AI systems. For example, when a user performs a transaction within a block of a template of the user application 102 (e.g., in a docs template 108), the API 128 processes the transaction and saves the changes associated with the transaction to the database 126. The integrations unit 124 is a tool connecting the platform 100 with external systems and software platforms. Such external systems and platforms can include other databases (e.g., cloud storage spaces), messaging software applications, or audio or video conference applications. The administration unit 130 is configured to manage and maintain the operations and tasks of the server 106. For example, the administration unit 130 can manage user accounts, data storage, security, performance monitoring, etc. According to various implementations, the administration unit 130 and/or databases 126 can include various data stores for storage, retrieval and management of ontologies, user accounts, permissions, security settings, AI/ML models, AI/ML frameworks, and so forth.

Transformer Neural Network

To assist in understanding the present disclosure, some concepts relevant to neural networks and machine learning (ML) are discussed herein. For example, the query engine 123 can include or be communicatively coupled to one or more neural networks 125a. A particular neural network 125a of the query engine 123 can be a transformer. The transformer can implement an LLM. The transformer can accept a set of question pairs as an input and generate an output set. The output set can include queries (e.g., XML queries, SQL queries, segments of executable code) or query elements (e.g., "where" or "having" clauses, specifications for property names, property conditions, and/or property options). Additionally or alternatively, the output set can include semantic reasoner logic (e.g., automatically generated prompts and/or string search specifications, proximity operators such as "with," "near," "w/#"). Additionally or alternatively, the output set can include one or more traceability indicators directed to exception or boundary cases where the neural network (e.g., an LLM) is not able to answer a question based on schema insufficiency or lack of permissions. The traceability indicators can include confidence intervals and/or other statistical measures.

Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN can encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification, etc.) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a "language model"), the training dataset may be a collection of text documents, referred to as a "text corpus" (or simply referred to as a "corpus"). The corpus may represent a language domain (e.g., a single language), a subject domain (e.g., scientific papers), and/or may encompass another domain or domains, be they larger or smaller than a single language or subject domain. For example, a relatively large, multilingual, and non-subject-specific corpus can be created by extracting text from online web pages and/or publicly available social media posts. Training data can be annotated with ground truth labels (e.g., each data entry in the training dataset can be paired with a label) or can be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data can be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters can be determined based on the measured performance of one or more of the trained ML models, and the first step of training (e.g., with the training set) may begin again on a different ML model described by the new set of determined hyperparameters. In this way, these steps can be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (e.g., update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (e.g., "learn") the parameters to reduce the loss function. Backpropagation is performed iteratively so that the loss function is converged or minimized. Other techniques for learning the parameters of the ML model can be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters can then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publicly available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to an ML-based language model, there could exist non-ML language models. In the present disclosure, the term "language model" can refer to an ML-based language model (e.g., a language model that is implemented using a neural network or other ML architecture), unless stated otherwise. For example, unless stated otherwise, the "language model" encompasses LLMs.

A language model can use a neural network (typically a DNN) to perform natural language processing (NLP) tasks. A language model can be trained to model how words relate to each other in a textual sequence, based on probabilities. A language model may contain hundreds of thousands of learned parameters or, in the case of an LLM, can contain millions or billions of learned parameters or more. As non-limiting examples, a language model can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

A type of neural network architecture, referred to as a "transformer," can be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models (e.g., Long Short-Term Memory (LSTM) networks, Gated Recurrent Unit (GRU) networks, Hierarchical Attention Networks, Neural Turing Machines), state space models (SSMs), CNNs (e.g., CNNs for text classification, Capsule Networks), Memory Augmented Neural Networks (MANN), or Pointer Sentinel Mixture Models (PSMM)).

Figure 2:
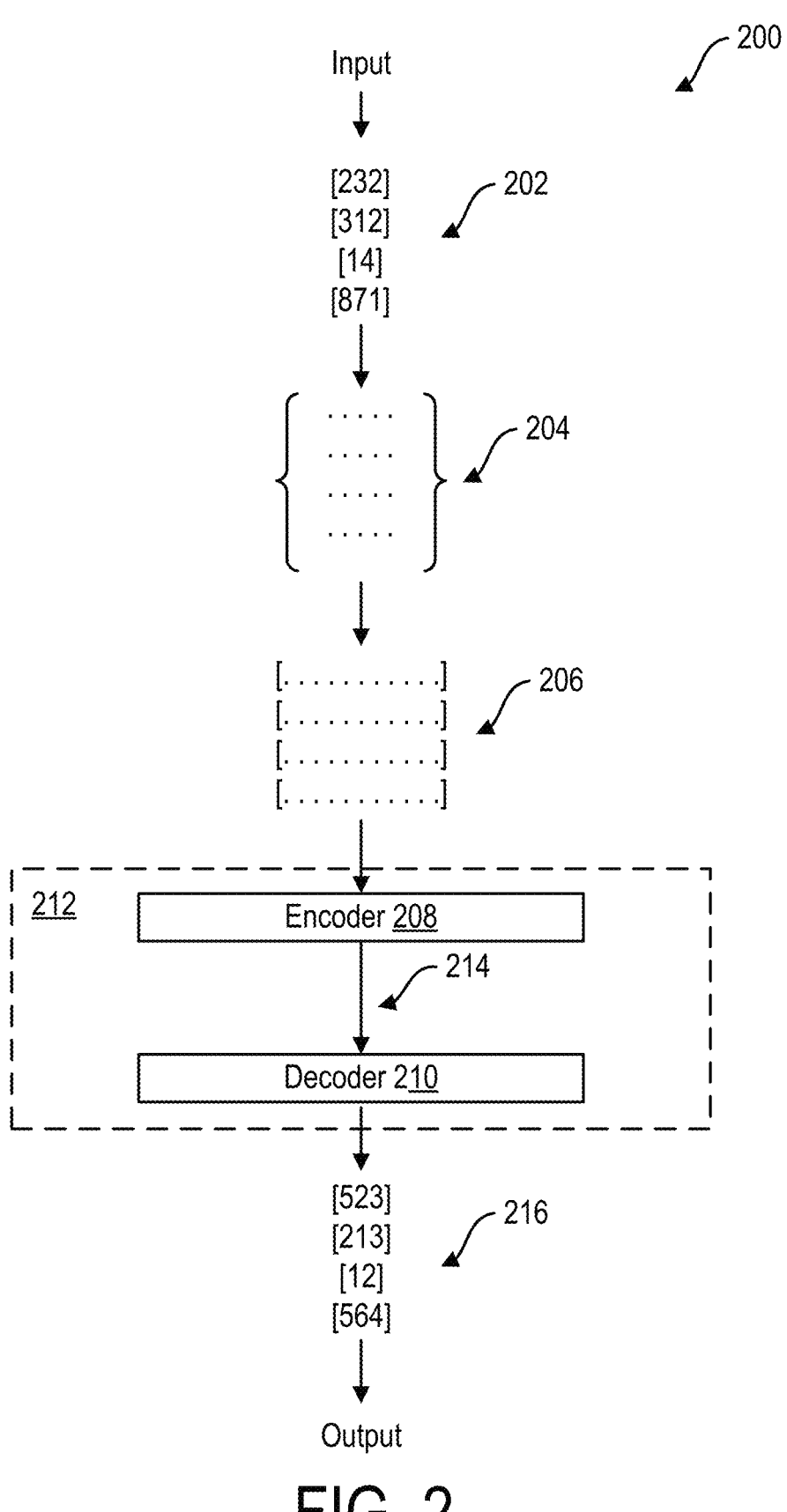
FIG. 2 is a block diagram of a transformer neural network, which may be used in examples of the present disclosure.

FIG. 2 is a block diagram 200 of an example transformer 212. A transformer is a type of neural network (e.g., LLM) architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure may be applicable to any ML-based language model, including language models based on other neural network architectures such as recurrent neural network (RNN)-based language models.

The transformer 212 includes an encoder 208 (which can include one or more encoder layers/blocks connected in series) and a decoder 210 (which can include one or more decoder layers/blocks connected in series). Generally, the encoder 208 and the decoder 210 each include multiple neural network layers, at least one of which can be a self-attention layer. The parameters of the neural network layers can be referred to as the parameters of the language model.

The transformer 212 can be trained to perform certain functions on inputs, including natural language input. Examples of the functions include summarizing existing content, brainstorming ideas, writing a rough draft, fixing spelling and grammar, and translating content. Summarizing can include extracting key points or themes from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some implementations, the transformer 212 is trained to perform certain functions on input formats other than natural language input. For example, the input can include objects, images, audio content, or video content, or a combination thereof.

The transformer 212 can be trained on a text corpus that is labeled (e.g., annotated to indicate verbs, nouns) or unlabeled. LLMs can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input).

FIG. 2 illustrates an example of how the transformer 212 can process textual input data. Input to a language model (whether transformer-based or otherwise) typically is in the form of natural language that can be parsed into tokens. The meaning of the term "token" in the context of language models and NLP differs from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some implementations, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 2, a short sequence of tokens 202 corresponding to the input text is illustrated as input to the transformer 212. Tokenization of the text sequence into the tokens 202 can be performed by some pre-processing tokenization module such as, for example, a byte-pair encoding tokenizer (the "pre" referring to the tokenization occurring prior to the processing of the tokenized input by the LLM), which is not shown in FIG. 2 for brevity. In general, the token sequence that is inputted to the transformer 212 can be of any length up to a maximum length defined based on the dimensions of the transformer 212. Each token 202 in the token sequence is converted into an embedding vector 206 (also referred to as "embedding 206").

An embedding 206 is a learned numerical representation (such as, for example, a vector) of a token that captures some semantic meaning of the text segment represented by the token 202. The embedding 206 represents the text segment corresponding to the token 202 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 206 corresponding to the "write" token will be closer to another embedding corresponding to the "jot down" token in the vector space as compared to the distance between the embedding 206 corresponding to the "write" token and another embedding corresponding to the "summary" token.

The vector space can be defined by the dimensions and values of the embedding vectors. Various techniques can be used to convert a token 202 to an embedding 206. For example, another trained ML model can be used to convert the token 202 into an embedding 206. In particular, another trained ML model can be used to convert the token 202 into an embedding 206 in a way that encodes additional information into the embedding 206 (e.g., a trained ML model can encode positional information about the position of the token 202 in the text sequence into the embedding 206). In some implementations, the numerical value of the token 202 can be used to look up the corresponding embedding in an embedding matrix 204, which can be learned during training of the transformer 212.

The generated embeddings 206 are input into the encoder 208. The encoder 208 serves to encode the embeddings 206 into feature vectors 214 that represent the latent features of the embeddings 206. The encoder 208 can encode positional information (i.e., information about the sequence of the input) in the feature vectors 214. The feature vectors 214 can have very high dimensionality (e.g., on the order of thousands or tens of thousands), with each element in a feature vector 214 corresponding to a respective feature. The numerical weight of each element in a feature vector 214 represents the importance of the corresponding feature. The space of all possible feature vectors 214 that can be generated by the encoder 208 can be referred to as a latent space or feature space.

Conceptually, the decoder 210 is designed to map the features represented by the feature vectors 214 into meaningful output, which can depend on the task that was assigned to the transformer 212. For example, if the transformer 212 is used for a translation task, the decoder 210 can map the feature vectors 214 into text output in a target language different from the language of the original tokens 202. Generally, in a generative language model, the decoder 210 serves to decode the feature vectors 214 into a sequence of tokens. The decoder 210 can generate output tokens 216 one by one. Each output token 216 can be fed back as input to the decoder 210 in order to generate the next output token 216. By feeding back the generated output and applying self-attention, the decoder 210 can generate a sequence of output tokens 216 that has sequential meaning (e.g., the resulting output text sequence is understandable as a sentence and obeys grammatical rules). The decoder 210 can generate output tokens 216 until a special [EOT] token (indicating the end of the text) is generated. The resulting sequence of output tokens 216 can then be converted to a text sequence in post-processing. For example, each output token 216 can be an integer number that corresponds to a vocabulary index. By looking up the text segment using the vocabulary index, the text segment corresponding to each output token 216 can be retrieved, the text segments can be concatenated together, and the final output text sequence can be obtained.

In some implementations, the input provided to the transformer 212 includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text (e.g., adding bullet points or checkboxes). As an example, the input text can include meeting notes prepared by a user and the output can include a high-level summary of the meeting notes. In other examples, the input provided to the transformer includes a question or a request to generate text. The output can include a response to the question, text associated with the request, or a list of ideas associated with the request. For example, the input can include the question "What is the weather like in San Francisco?" and the output can include a description of the weather in San Francisco. As another example, the input can include a request to brainstorm names for a flower shop and the output can include a list of relevant names.

Although a general transformer architecture for a language model and its theory of operation have been described above, this description is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), can accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as the internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ multiple processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Input to an LLM can be referred to as a prompt, which is a natural language input that includes instructions to the LLM to generate a desired output. A computer system can generate a prompt that is provided as input to the LLM via an API (e.g., the API 128 in FIG. 1).

As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Prompts to the trained neural network 125a can include questions from schema-question pairs or the entirety of schema-question pairs. For example, a particular zero-shot prompt can include a schema-question pair in its entirety. A particular one-shot prompt can include a question accompanied by one example of a schema to query, where the trained neural network 125a can generate additional suggestions of schema elements to query. A particular few-shot prompt can include a question accompanied by two or more examples of schemas to query.

Hierarchical Organizational Blocks in a Workspace

Page Blocks

Figure 3:
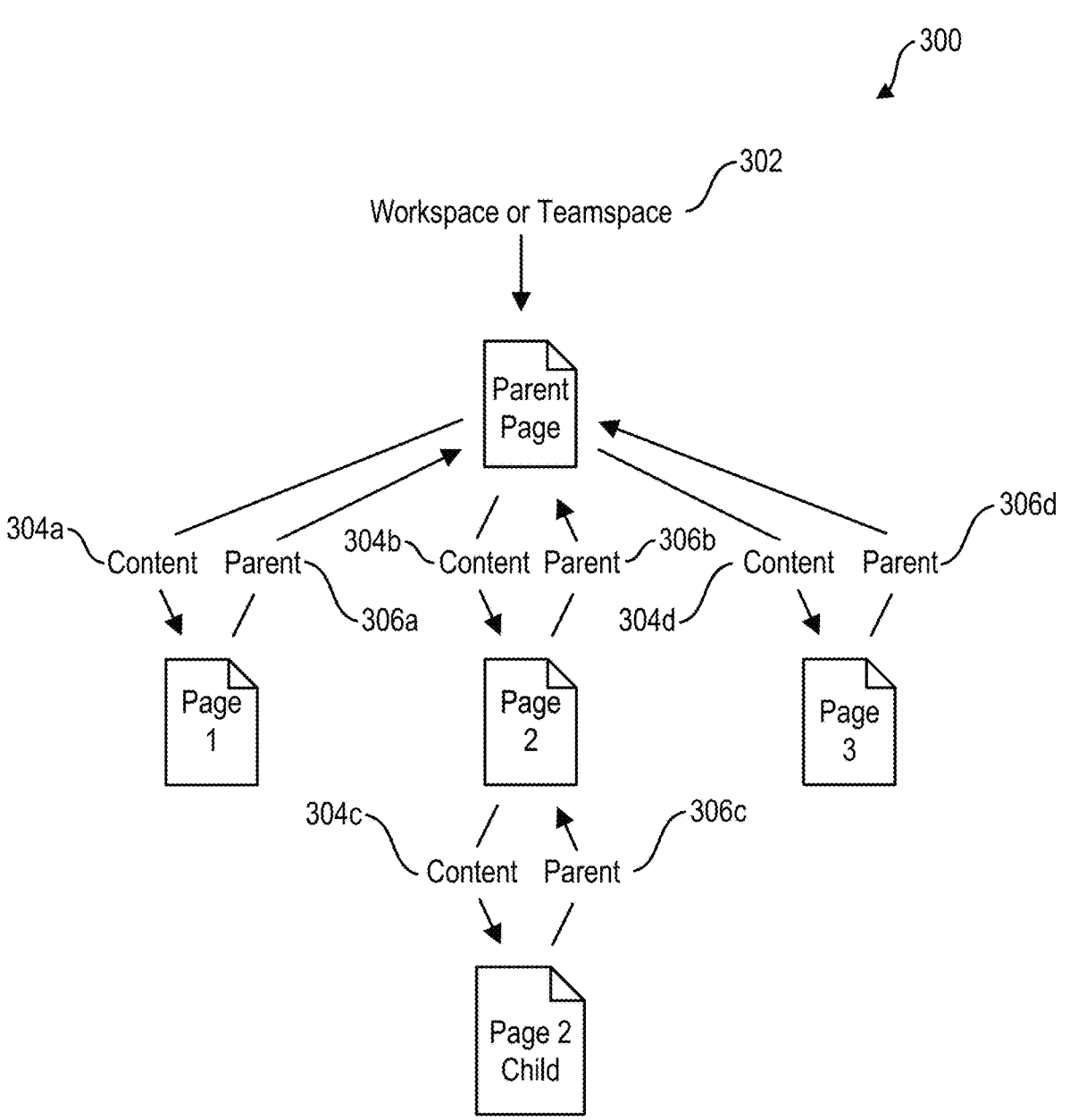
FIG. 3 is a block diagram illustrating a hierarchical organization of pages in a workspace, according to some arrangements.

The query engine described herein can discover page blocks that are responsive to specific questions, query the data in discovered page blocks, and manage (generate, populate, render, modify, refresh, persist) ephemeral views generated based on the queries. To that end, FIG. 3 is a block diagram 300 illustrating a hierarchical organization of pages in a workspace. A particular page can include textual elements, graphical elements, links, computer-readable code, and/or computer-executable code.

As described with respect to the block data model of the present technology, a workspace can include multiple pages (e.g., page blocks). The pages (e.g., including parent pages and child or nested pages) can be arranged hierarchically within the workspace or within one or more teamspaces 302, as shown in FIG. 3.

A teamspace 302 can refer to a collaborative space associated with a team or an organization that is hierarchically below a workspace. For example, a workspace can include a teamspace 302 accessible by all users of an organization and multiple teamspaces 302 that are accessible by users of different teams. Accessibility generally refers to creating, editing, and/or viewing content (e.g., pages) included in the workspace or the one or more teamspaces 302.

In the hierarchical organization illustrated in FIG. 3, a parent page (e.g., "Parent Page") is located hierarchically below the workspace or teamspace 302. The parent page includes three child pages (e.g., "Page 1," "Page 2," and "Page 3"). Each of the child pages can further include subpages (e.g., "Page 2 Child," which is a grandchild of "Parent Page" and a child of "Page 2"). The "Content" arrows (304a-304d) in FIG. 3 indicate the relationship between the parents and children while the "Parent" arrows (306a-306d) indicate the inheritance of access permissions. The child pages inherit access permission from the (immediate) parent page under which they are located hierarchically (e.g., which is above them in the tree). For example, "Page 2" inherited the access permission of "Parent Page" as a default when it was created under its parent page. Similarly, "Page 2 Child" inherited the access permission of the parent page as a default when it was created under its parent page. "Parent Page," "Page 2," and "Page 2 Child" thereby have the same access permission within the workspace.

The relationships and organization of the content can be modified by changing the location of the pages. For example, when a child page is moved to be under a different parent, the child page's access permission modifies to correspond to the access permission of the new parent. Also, when the access permission of "Parent Page" is modified, the access permission of "Page 1," "Page 2," and "Page 3" can be automatically modified to correspond to the access permission of "Parent Page" based on the inheritance character of access permissions.

In contrast, however, a user can modify the access permission of the children independently of their parents. For example, the user can modify the access permission of "Page 2 Child" in FIG. 3 so that it is different from the access permission of "Page 2" and "Parent Page." The access permission of "Page 2 Child" can be modified to be broader or narrower than the access permission of its parents. As an example, "Page 2 Child" can be shared on the internet while "Page 2" is only shared internally with the users associated with the workspace. As another example, "Page 2 Child" can be shared only with an individual user while "Page 2" is shared with a group of users (e.g., a team of the organization associated with the workspace). In some implementations, the hierarchical inheritance of the access permissions described herein can be modified from the previous description. For example, the access permissions of all the pages (parent and children) can be defined as independently changeable.

Organizing sets of hierarchical blocks in pages provides a host of technical advantages, including the ability to create relational linkages (between blocks and/or pages) in multimodal content, ability to dynamically create multimodal content with various content types added on-demand, ability to synchronize block editing operations when a particular block is included in multiple pages, and ability to optimize multimodal content for AI-based analytical operations such that performance metrics of AI-based models (e.g., accuracy, recall, F-1 score, and so forth) are maximized. For example, when a page includes multimodal content distributed across several blocks, collections of block properties can vary across modalities, which can be represented by blocks, and block properties can serve as built-in data labels to enable neural networks to identify block structure and content.

Block Properties

Various types of page blocks can have various attributes, which can include properties. Collections of properties can be predefined for particular templates. For example, a document template can include property collections for blocks in the template. The property collections can, for example, specify the creator, tags, and last edited date/time. As another example, a project template can include properties that include task statuses, task due dates, task assignees, task priorities, task dependencies, and so forth. In some implementations, the GUI enables users to add various custom properties. Some properties can be AI-generated (e.g., AI summary, AI key information, AI custom autofill, AI translation). Some properties can include function calls to integrations, such as Google integrations, GitHub integrations, Figma integrations, Zendesk integrations, and so forth. Properties can include text, numerical information, email addresses, phone numbers, formulas, roll-ups, time stamps, permission information and/or user identifiers, files, media, URLs, and so forth.

In schema-question pairs, block properties can be utilized, alone or in conjunction with other elements such as block types, block dependencies, block content values, block content types, and/or block format, to train the neural network 125a. Because block property collections do not change as often as block content, training the neural network 125a on block properties can serve as a fall-back to dynamic schema discovery and can enable the platform to be tuned on comparatively smaller data sets, such as property collections or even smaller sets of updates to the property collections. In this manner, the risk of model drift can be managed and reduced such that the model retains predictive relevancy as measured by a suitable performance metric (e.g., accuracy, recall, F-1 score, and so forth).

Example Query Engine Architecture

Figure 4:
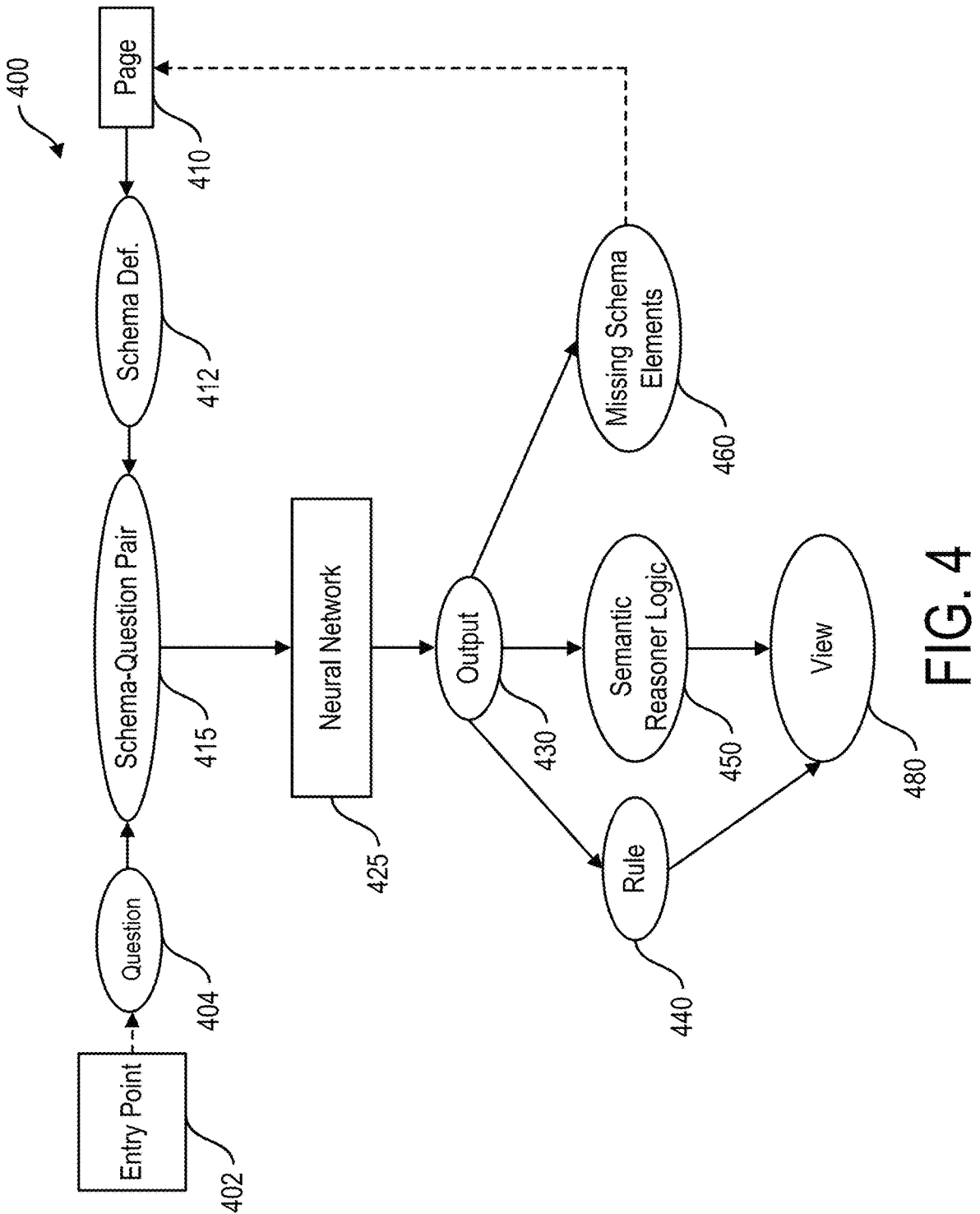
FIG. 4 is a component diagram illustrating aspects of operation of a query engine of the platform, where the query engine can query dynamic data structures of the platform using natural language input, according to some arrangements.

FIG. 4 is a component diagram 400 illustrating aspects of operation of the query engine 123 of the platform of FIG. 1, according to some arrangements. For example, the query engine 123 can be configured to discover and query dynamic data structures of the platform using natural language input.

In operation of the platform, the schema generator 123a can detect an initialization event for page 410. Examples of page 410 initialization events can include page 410 load, page 410 refresh, or other suitable events. For instance, when a user accesses a particular page 410 of the platform, computer-executable code can retrieve and render the content blocks that comprise the page 410.

Upon detecting a page 410 initialization event, the schema generator 123a can generate a schema definition 412, which enables data discovery by the query engine 123.

The schema definition 412 (shown, for example, in FIG. 6A) can include a structured representation of linked elements in the block structure that correspond to a particular page. Furthermore, the schema definition 412 can include a set of identifiers that link to additional blocks that a particular page or user is permitted to access.

To illustrate, a particular page 410 can include a block that stores a document. The page 410 can include a property collection that includes links to additional blocks storing information about document contributors. Although only a subset of the additional information (e.g., contributor user names) might be displayed on the rendered page 410, further items in the additional information may be responsive to common user queries about the document of page 410. For example, a particular user may want to know which members of a particular team (e.g., "Marketing," "Operations") have contributed content to the document rendered at page 410. Accordingly, the schema definition 412 can include an identifier set that links items from the property collection of the document to blocks where team member group membership is stored.

The schema definition 412 can reference one or more database views that can represent a collection (e.g., full or partial aggregation or concatenation) of two or more blocks linked via properties. In some implementations, the schema definition 412 can include a set of database views where the database views each represent a distinct set of blocks that further contextualize a particular aspect or property of a block on page 410. For example, a first set of database views can contextualize team membership of document contributors for a document block of page 410, as described above. A second set of database views can contextualize another aspect of the document block of page 410, such as the last modified timestamp, by providing a reference to a block that stores document update information or to a timestamp property of the document block of page 410. A third set of database views can contextualize yet another aspect of the document of page 410 by providing a reference to a collection of blocks that include information about mentions of the document of page 410 (e.g., mention user, mention source, mention URL, mention date, mention citation, and so forth).

Advantageously, because the schema definition 412 is generated dynamically for the particular page 410, the query engine 123 can dynamically discover various context items for the page 410. The query engine 123 is not restricted by real-time changes to these context items, such as addition or deletion of properties, changes in data content of linked blocks (e.g., updates to people's team memberships or new mentions of the document), and so forth. That is, many real-time schema or data changes can be detected, without updating the schema definition 412, using the architecture disclosed herein. Furthermore, unlike in relational databases where the query writer needs to understand the object and relation structure of the database, including field names, the query engine 123 can generate various types of queries based on various, even not previously contemplated, questions 404, because the block-property structure and database view structure have flexibility to accommodate ad hoc schema changes.

To generate a response to a particular question 404, the schema definition 412 can be combined with elements of question 404 to generate an input feature set for the neural network 425. To that end, the schema definition 412 can be made accessible to various executables that can be invoked from the page 410. For example, an entry point interceptor 123*b* as shown in FIG. 1 can detect a user interaction with an entry point 402 on the page 410. The user interaction can include a natural language question 404 about the page 410, such as "Which Marketing manager(s) contributed to the document [of page 410]?" One of skill will appreciate that the entry point 402 can assume various forms. For example, the entry point 402 can be an input control of a chatbot that simulates an actor in a conversation. The chatbot can include executable code embodied on circuitry included in a variety of form factors, such as a voice assistant ("smart speaker") programmatically accessible to executables of page 410, a web page or applet that includes or is included in page 410, a desktop application structured to render page 410, a mobile application structured to render page 410, a dialog box programmatically invoked at page 410, and so forth.

The schema definition 412 and the natural language question 404 can be used, in whole or in part, by the AI/ML-based query generator 123*c*, to generate a schema-question pair 415, which can be an input feature to the neural network 425 (e.g., an LLM). In some implementations, the natural language question 404 and/or the schema definition 412 can be pre-processed using automatic prompt engineering techniques to optimize the schema-question pair 415 and improve responsiveness of the neural network 425. To illustrate, consider the following example question 404: "Which team members from Marketing have worked with this document?" The platform can tokenize (break down into units, such as words) the question 404 to extract tokens, such as "team members from Marketing," "worked with," and "this document." The token "this document" can cause the platform to reference the particular schema definition 412 of page 410 (and, for example, forgo generating or referencing additional schema definitions 412 for other platform blocks the asking user is permissioned to access). The token "team members from Marketing" can cause the platform to modify the schema definition 412 to reduce it down to pointers to the relevant database views (e.g., "contributors") such that a particular, responsive subset of the schema definition 412 is included in the schema-question pair 415. The token "worked with" can cause the platform to further modify the schema definition 412 to include, along with the "contributors" database view, an additional database view, "mentions," because "worked with" can encompass both contributors and mentions.

In some implementations, an upstream neural network (not shown) or a retrieval-augmented generation (RAG) technique can be used to tune the question 404 (by, for example, generating a prediction that "worked with" can relate to both "contributors" and "mentions" and including appropriate aspects of the discovered schema definition 412). This approach, and/or employing techniques for modifying the schema definition 412 to filter down to the relevant views, such as "contributors" and "mentions," can enable the platform to automatically generate one- or few-shot prompts that can, by including examples of data sources to query, significantly improve the quality of the output 430 generated by the neural network 425.

The neural network 425 can use schema-question pairs 415 to generate outputs 430. Outputs 430 can take various forms, including rules 440, semantic reasoner logic 450, and/or missing schema elements 460.

Figure 6A:
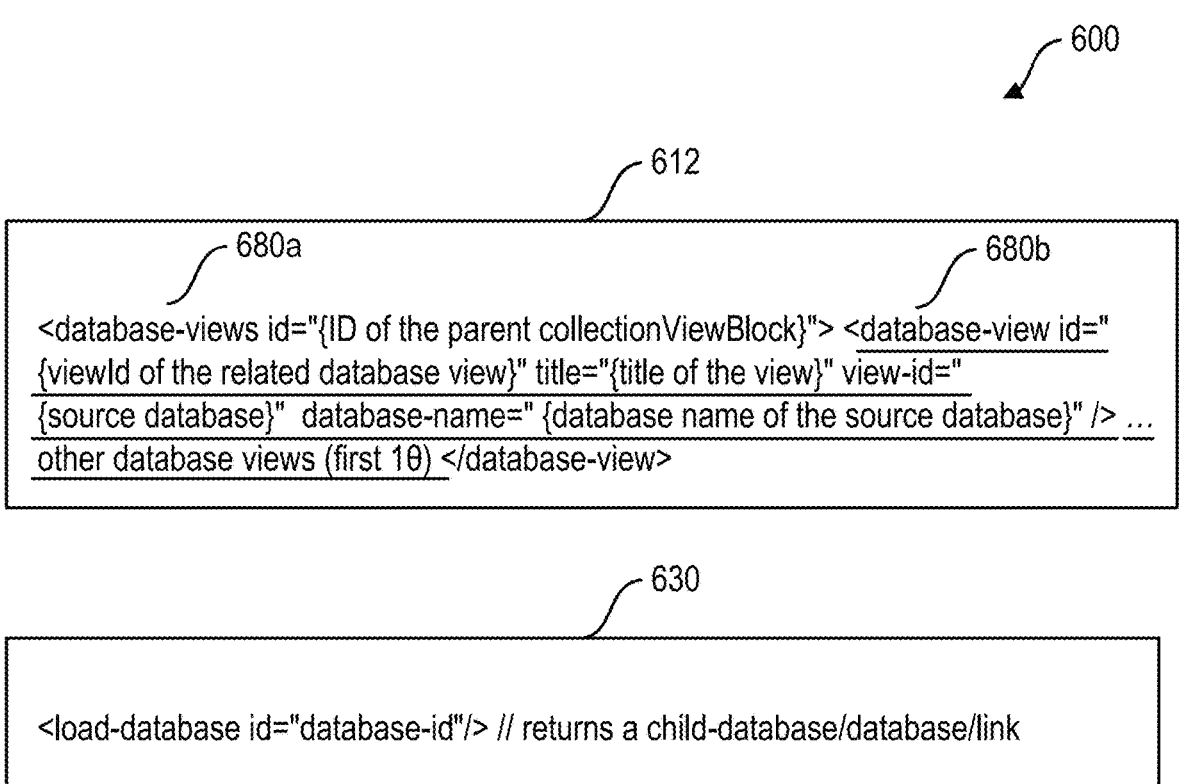
FIG. 6A is an example definition of a dynamic data structure discoverable by the query engine of the platform from a particular page, according to some arrangements.
Figures 7A, 7B:
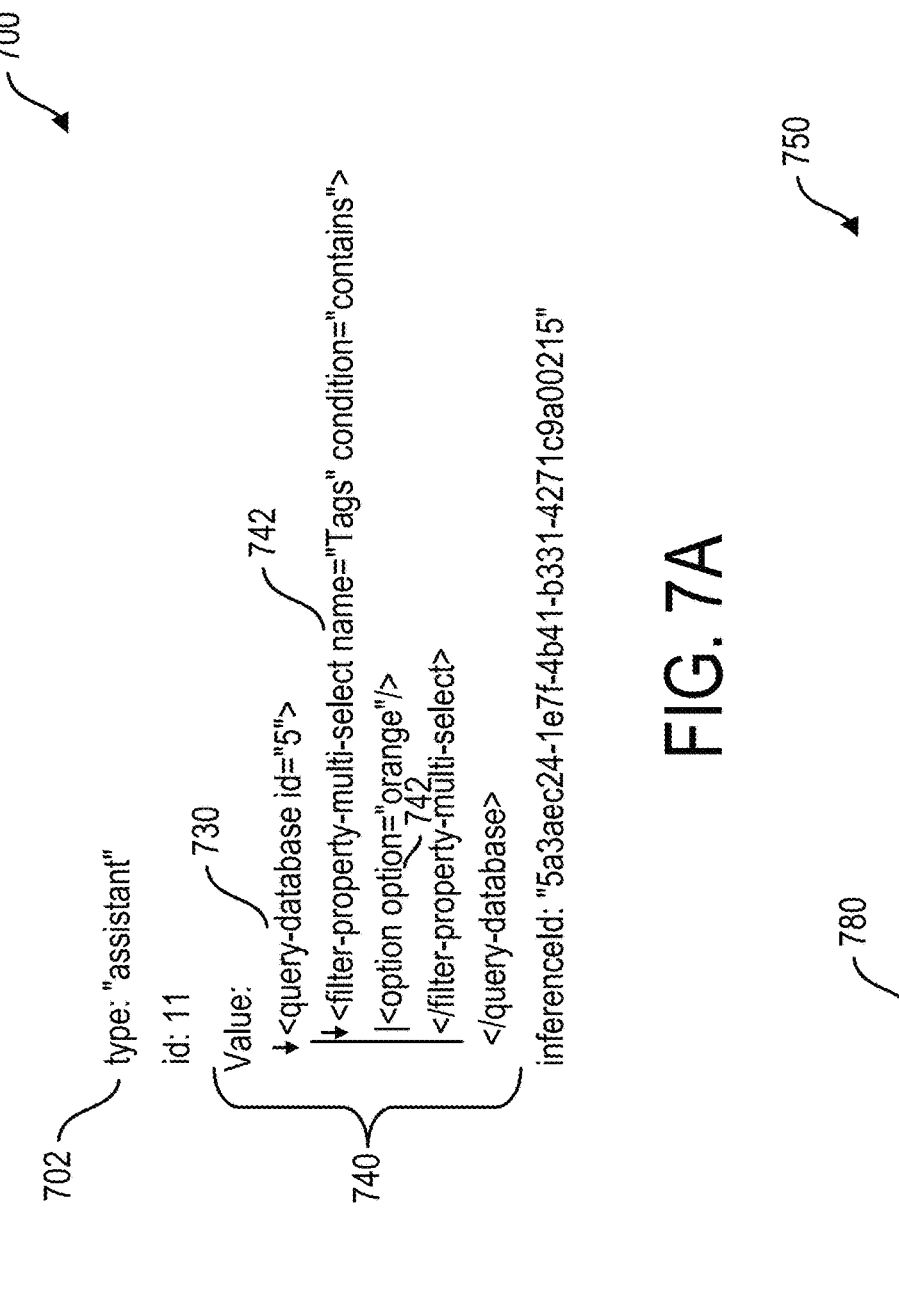
FIG. 7A is an example markup-language definition of a rule for generating or tuning an ephemeral view, where the rule can be dynamically generated by a trained neural network, such as a trained LLM, according to some arrangements.
FIG. 7B is an example command string to generate a result set to populate an ephemeral view, where the result set can be generated using a rule, according to some arrangements.

In an example, an output 430 can include a rule 440, such as rule 640 of FIG. 6B, which can be further tuned by a user, via an ephemeral view, to example rule 740 of FIG. 7A. The rule 440 can be a structured code unit that includes a query or an element of a query.

A "query," as used herein and also sometimes referred to as a "code unit," refers to automatically generated computer code that can cause retrieval, from a data store, of specified information or can perform other data operations (create, update, delete, change schema, and so forth). The automatically generated queries can include SQL queries, XML queries, fuzzy-logic queries, and/or API calls. A query can include a query string composed of rule elements (e.g., name, condition, option) and a wrapper string, such as an HTTP method or an API call. The query can therefore be executed against the block-based structure to generate an ephemeral view 480, which can optionally be persisted. For example, a query can include an HTTP command (e.g., GET, POST) that sends a query to a server. The query can also include a target URL, which can include a block identifier and/or a database identifier. The target URL can be determined, for example, using metadata of the page 410 or using the schema definition 412.

In an example, the output 430 can include semantic reasoner logic 450. In one use case, the semantic reasoner logic 450 is included in addition to the rule 440 or augments the rule 440. For example, the semantic reasoner logic 450 can augment the rule 440 with a string search specification using proximity operators such as "with," "near," "w/#" to modify the ephemeral view 480. For example, the ephemeral view 480 can be automatically filtered based on semantic reasoner logic 450. For example, the rule 440 might return all mentions of a document of page 410, and the semantic reasoner logic 450 can filter down to substantive mentions of the document, which can be indicated by "document title" found within #words of an action or analysis verb ("calls for," "interprets," "provides," "stipulates," and so forth).

In an example, the output 430 can include an indication of missing schema elements 460 to account for use cases where the neural network 425 is not able to answer a question because of schema insufficiency, data insufficiency, or lack of permissions. Criteria for generating indications of missing schema elements 460 can be set using hyperparameter tuning techniques for the neural network 425 (for example, by setting a model's confidence level to be at or above a predetermined threshold). Indications of missing schema elements 460 can include various traceability indicators, such as input question 404, schema definition 412, schema-question pair 415, candidate queries/rules 440, and their associated confidence values. In some implementations, the platform can route the missing schema elements 460, in an electronic message, to a power user or administrator and generate a user interface that enables the power user/administrator to modify and/or execute the candidate queries/rules 440. In some implementations, the platform can cause the page 410 to be automatically refreshed and/or cause the schema definition 412 to be automatically refreshed to generate an updated schema-question pair 415 for the neural network 425 based on the original question 404.

Example User Interfaces and Data Structures of the
Query Engine

The platform described herein enables users to ask natural language questions about block content and properties, including content and properties not ordinarily visible at a particular page in the block structure. The AI-generated queries can be based on an automatically discovered data structure that identifies block relations, even for blocks not included in a particular displayed page and blocks downstream of such out-of-context blocks. Furthermore, the platform enables users to tune ephemeral views generated by automatically executing AI-generated queries.

Figure 5A:
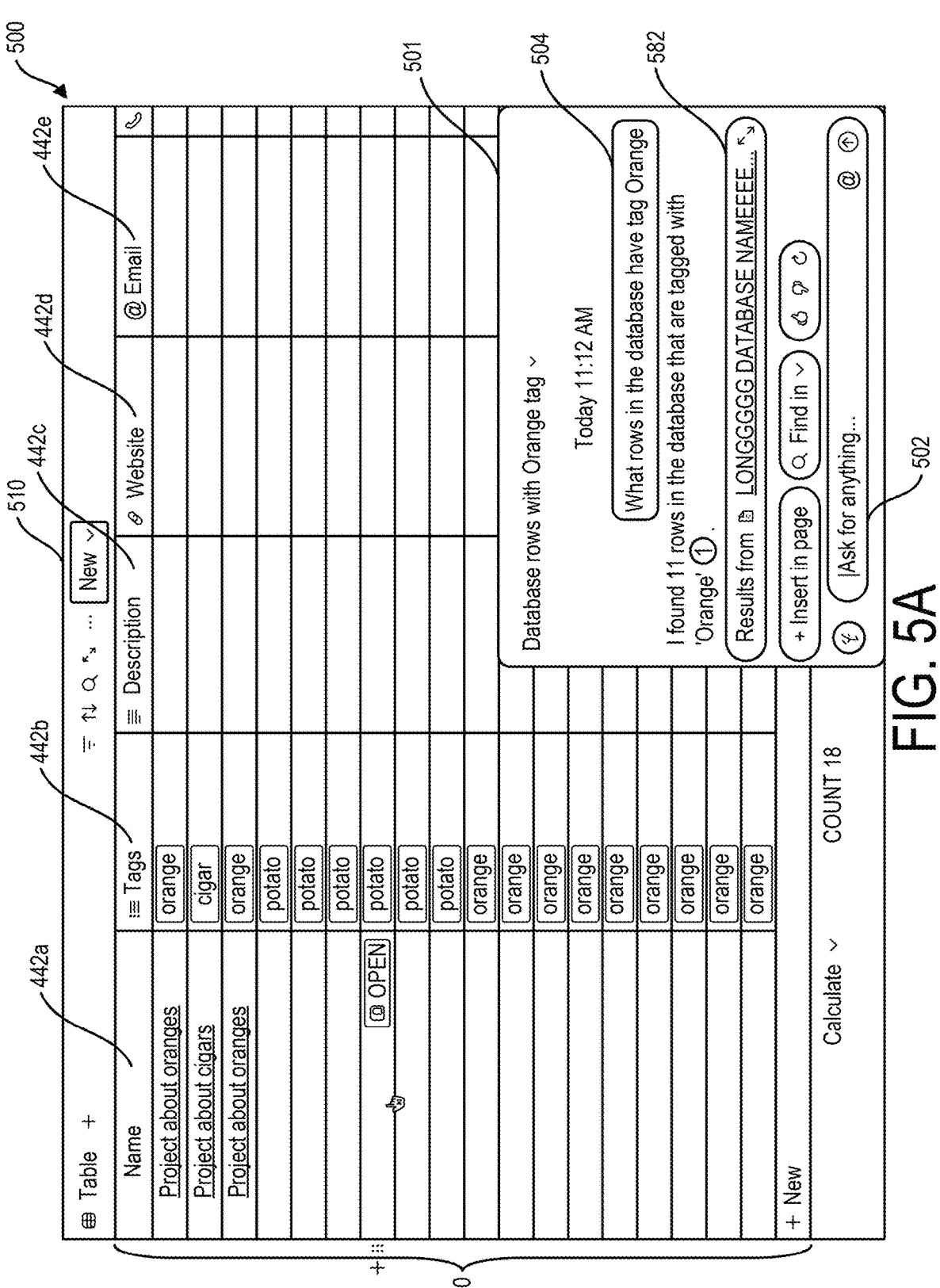
FIG. 5A is an example graphical user interface (GUI) that provides an entry point to the query engine of the platform, according to some arrangements.
Figure 5B:
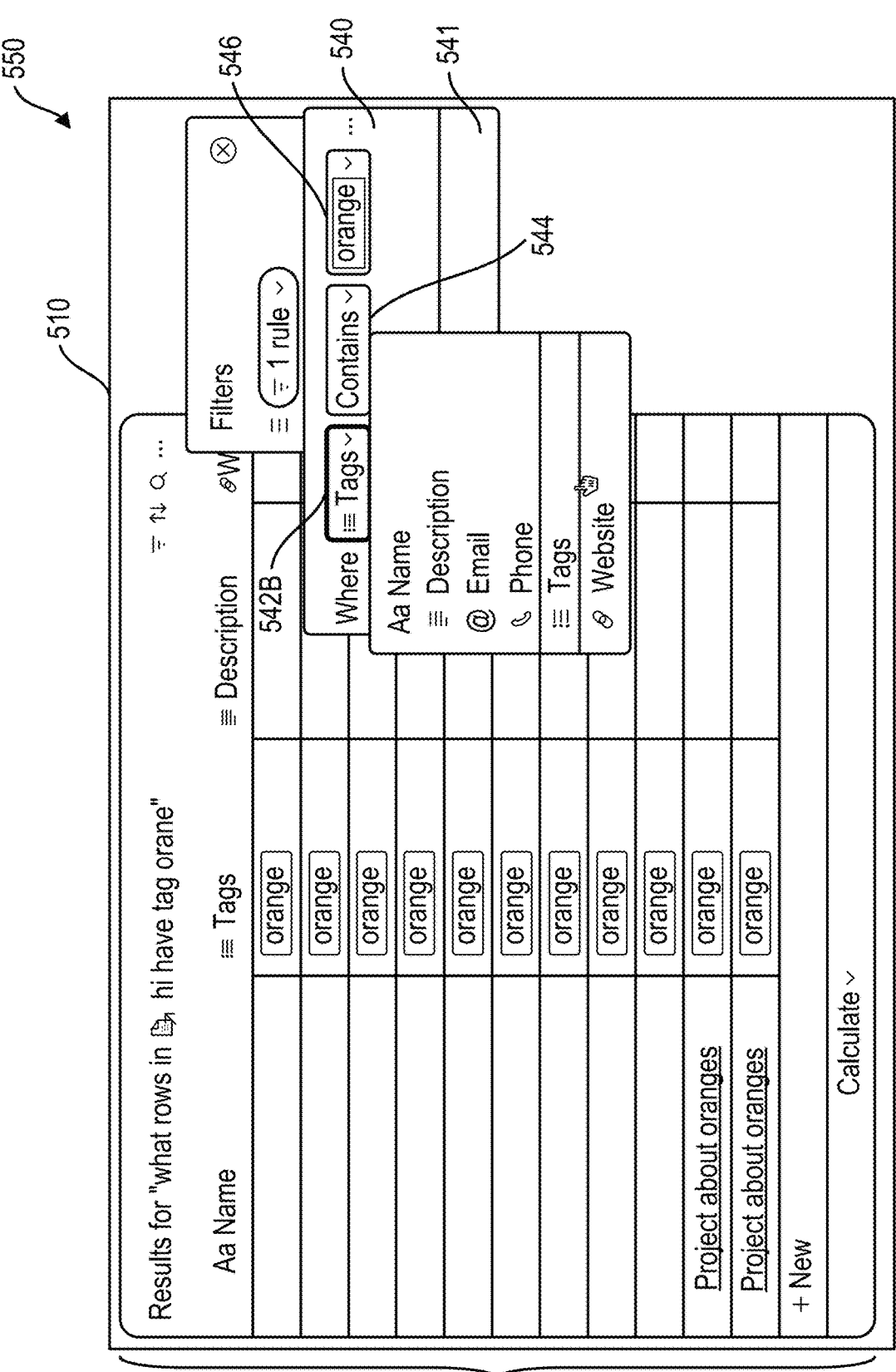
FIG. 5B is an example GUI that illustrates aspects of an ephemeral view generated, by the query engine of the platform, by querying dynamic data structures using queries generated by a trained neural network, such as a trained large language model (LLM), according to some arrangements.

To that end, FIG. 5A is an example graphical user interface (GUI) 500 that provides an entry point 502 to the query engine 123 of the platform, according to some arrangements. FIG. 5B is an example GUI 550 that illustrates aspects of an example ephemeral view 580 generated, by the query engine 123 of the platform, by querying dynamic data structures using one or more queries generated by a neural network 425, according to some arrangements. FIG. 6A is an example schema definition 612 of a dynamic data structure discoverable from a particular page 510 of FIGS. 5A and 5B, according to some arrangements. FIG. 6B is an example definition 650 of a dynamically constructed query executable against the dynamic data structure, according to some arrangements, where the query includes an example rule 640. The rule 640 can be AI-generated using a natural language prompt received at the entry point 502 of FIG. 5A.

In an example set of operations, the platform can load the page 510. Upon detection of the page 510 load event, the platform can automatically generate the schema definition 612 for the page 510.

The schema definition 612 can enable executables associated with the page 510 (e.g., code executable from or in response to events detected at the page 510) to access and visualize a large set of database results in an interactive way via the ephemeral view 580. To that end, the schema definition 612 can include a database views collection 680a. The database views collection 680a can include a set of database views 680b, where database views 680b include identifiers of various block linkages for the page 510. The block or database identifier for a block whose content is displayed on the page 510 can be used as a starting point for discovering these linkages. Accordingly, the block or database identifier for this block can be identifier 630, which can be included or associatively linked with the schema definition 612.

As part of user experience with the page 510, the platform can generate and cause the computing device to display a chatbot 501. The chatbot 501 can include an entry point 502, which can enable a user to interact with the platform by asking natural language questions, such as question 504 ("What rows in the database have the tag 'Orange'?"). The platform can tokenize the question 504.

The platform can then execute operations of the query engine 123 (e.g., operations described above) to generate the visualized ephemeral view 580. For instance, the platform can determine, by matching the question 504 to the schema definition 612 and feeding the resulting schema-question pair to a neural network (e.g., an LLM), that a particular responsive database view, visualized as ephemeral view 580, references database 582 ("LONGGGGG DATABASE NAMEEEE"). The database 582 can be discovered by traversing the schema definition 612 or the schema-question pair to identify a responsive database.

As an output set, the neural network could generate the rule 640 shown in FIG. 6B. The rule 640 can include a query or a query segment and can be used by the platform to generate and render the ephemeral view 580. Because the rule 640 can include elements not directly accessible for the initial version of the page 510, the ephemeral view 580 can enable visibility into additional, relevant aspects of the database in response to the user's question 504. The ephemeral view 580 can include attributes (442a-442e), which can correspond to the property collection 642 of the markup-language definition for the automatically generated rule 640. An example attribute 442b ("Tags"), for instance, corresponds to property 643 ("Tags") from the property collection 642.

Advantageously, the above example operations primarily relate to discovery and structuring of schema elements (blocks, properties) rather than schema content. This can significantly speed up operations of the neural network that generates example rule 640. Subsequently to generating the example rule 640 and initializing the corresponding ephemeral view 580, the ephemeral view 580 can be populated with content by generating and executing a command string that includes executing the AI-generated query. An example command string 750 is shown in FIG. 7B.

Advantageously, the ephemeral view 580 can be tunable via the GUI. For example, property 643 of FIG. 6B includes various components that can be modified by the user, via the GUI, by interacting with the ephemeral view 580 directly from the page 510. To that end, the ephemeral view 580 can include an ephemeral view tuning control 540, which enables the user to browse and modify various rules 440 that were automatically generated by the neural network to answer the user question 504. That is, the user is enabled to tune automatically generated query responses with respect to aspects of a schema shown in a particular ephemeral view 580, even if such aspects are not ordinarily visible or accessible from the page 510.

To illustrate rule modification and tuning of ephemeral views, FIG. 7A is an example tunable definition 700 of a rule 740 for the ephemeral view 580, where the rule 740 is dynamically generated by the trained neural network 425. FIG. 7B illustrates a command string 750 for generating a result set 780 for the ephemeral view 580. In an example, the ephemeral view tuning control 540 can enable the user to modify the AI-generated rule by setting the property to filter on (e.g., from AI-generated property 542b to user-specified property 742), setting property value 546 to filter on (e.g., to user-specified option 746), and/or setting a particular property condition 544 to use in the filter (e.g., to user-specified condition 744).

Advantageously, the ephemeral view 580 enables a high level of user interactivity with the block-based schema, where the user can access virtually any permissioned information in the block schema via a natural language query and optionally tune the result set. In some implementations, the ephemeral view 580 and/or modified ephemeral view 580 can be persisted as an embedded element or metadata on the page 510. Further, the ephemeral view 580 and/or modified ephemeral view 580 can be persisted as a new block or set of blocks (e.g., private page) for the requesting user.

Example Data Discovery Operations of the Query
Engine

FIG. 8A is a flowchart showing an example method 800 of the query engine to generate queries against dynamic data structures of the platform, according to some arrangements.

At step 810, the platform can generate and render, at a computing device, a page comprising a graphical user interface (GUI). The GUI can include a displayable item from a first block of a block-based data structure. At step 812, the platform can generate and bind, to the page, a schema definition comprising a first reference to the first block and a second reference to a set of blocks (e.g., a reference determined or generated based on a property of the first block). The first block can be relationally linked to the set of blocks via the second reference. In some implementations, the platform can cause the schema definition to be bound to the page while remaining inaccessible and/or invisible via the GUI. At step 814, the platform can capture, via an input control of the GUI, a natural language prompt. At step 816, the platform can use at least a portion of the natural language prompt to generate an input feature for a neural network (e.g., an LLM). The input feature can include a schema-question pair having at least a portion of the schema definition. For example, the at least a portion can be determined based on page context or user permissions. At step 818, the platform can, using the generated input feature, cause the neural network (e.g., an LLM) to generate a query (e.g., a query including one or more rules 440). The query can be responsive to the natural language prompt. The query can be executable against the block-based data structure. At step 820, the platform can cause the generated query to be executed against the block-based data structure to generate a result set.

Example Operations for Tuning AI-generated Queries via Ephemeral Views

FIG. 8B is a flowchart showing an example method 850 of the query engine to generate and manage ephemeral views, according to some arrangements. At step 860, the platform can generate and render, at a computing device, a page comprising a GUI that can include a displayable item from a first block of a block-based data structure. At step 862, the platform can capture, via an input control of the GUI, a natural language prompt. At step 864, the platform can use at least a portion of the natural language prompt to cause a neural network (e.g., an LLM) to generate a query executable against the block-based data structure to return a result set. The result set can include a second block from the block-based data structure. The second block is not initially displayed at the page and can be discoverable by determining query context. Query context can be determined using at least a portion of the natural language prompt in combination with a property of the first block. At step 866, the platform can cause the generated query to be executed against the block-based data structure to generate a result set comprising a displayable item from the second block. At step 868, the platform can generate and display, at the GUI, (i) an ephemeral view comprising the result set and (ii) a query tuning control configured to enable dynamic tuning of the generated query via the GUI.

In some implementations, the initial result set can include a first item in a first content modality and a second item in a second content modality different from the first content modality. The tuning control can additionally be operable to enable the user to set conditions for filtering content in different modalities (e.g., content originating from different blocks), where the content is included in a particular ephemeral view.

Computer System

Figure 9:
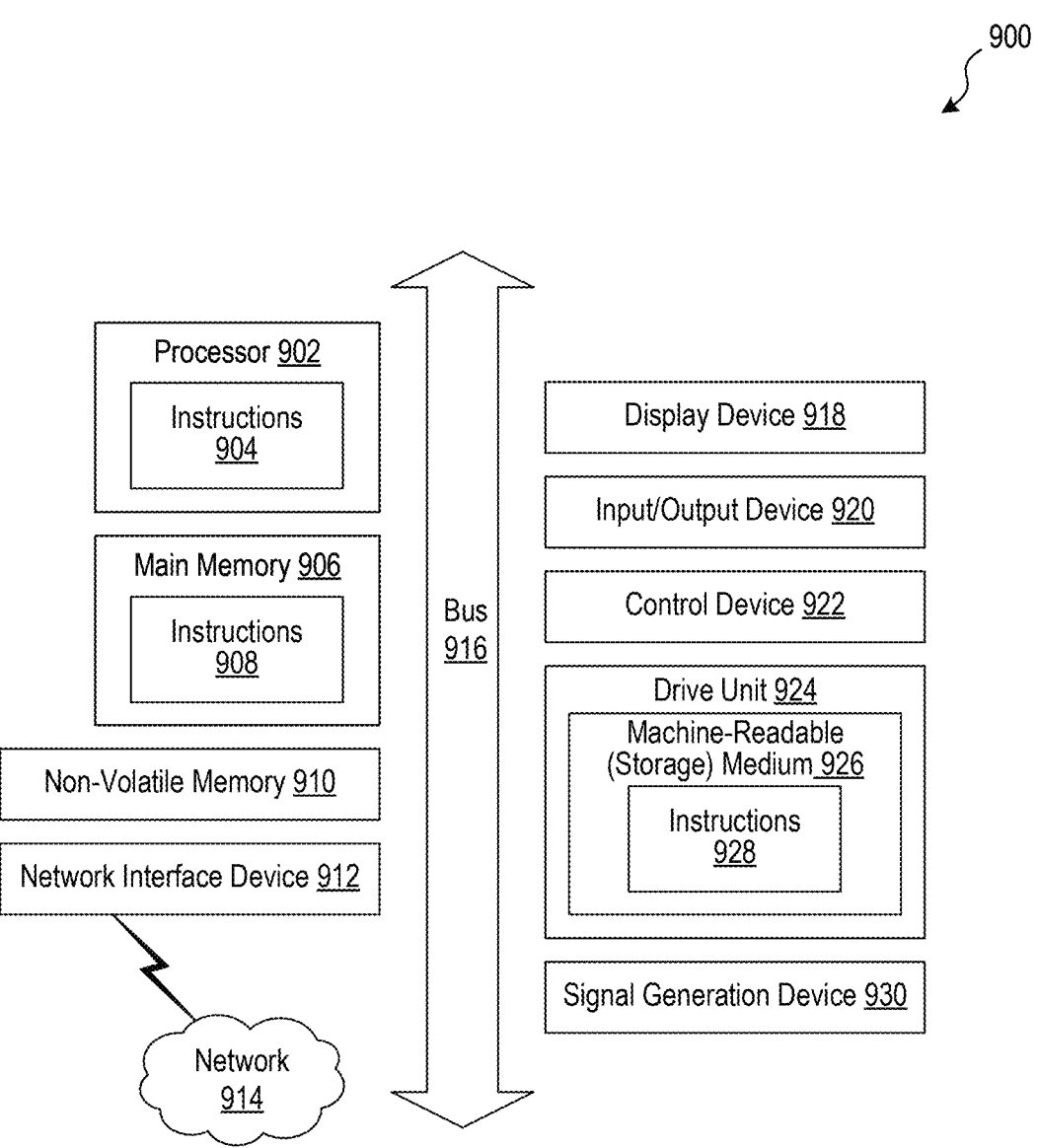
FIG. 9 is a block diagram that illustrates an example of a computer system in which at least some operations described herein can be implemented.

FIG. 9 is a block diagram that illustrates an example of a computer system 900 in which at least some operations described herein can be implemented. As shown, the computer system 900 can include: one or more processors 902, main memory 906, non-volatile memory 910, a network interface device 912, a display device 918, an input/output device 920, a control device 922 (e.g., keyboard and pointing device), a drive unit 924 that includes a machine-readable (storage) medium 926, and a signal generation device 930 that are communicatively connected to a bus 916. The bus 916 represents one or more physical buses and/or point-to-point connections that are connected by appropriate bridges, adapters, or controllers. Various common components (e.g., cache memory) are omitted from FIG. 9 for brevity. Instead, the computer system 900 is intended to illustrate a hardware device on which components illustrated or described relative to the examples of the figures and any other components described in this specification can be implemented.

The computer system 900 can take any suitable physical form. For example, the computer system 900 can share a similar architecture as that of a server computer, personal computer (PC), tablet computer, mobile telephone, wearable electronic device, network-connected ("smart") device (e.g., a television or home assistant device), augmented reality/ virtual reality (AR/VR) system (e.g., head-mounted display), or any electronic device capable of executing a set of instructions that specify action(s) to be taken by the computer system 900. In some implementations, the computer system 900 can be an embedded computer system, a system-on-chip (SOC), a single-board computer (SBC) system, or a distributed system such as a mesh of computer systems or include one or more cloud components in one or more networks. Where appropriate, one or more computer systems 900 can perform operations in real time, in near real time, or in batch mode.

The network interface device 912 enables the computer system 900 to mediate data in a network 914 with an entity that is external to the computer system 900 through any communication protocol supported by the computer system 900 and the external entity. Examples of the network interface device 912 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 906, non-volatile memory 910, machine-readable medium 926) can be local, remote, or distributed. Although shown as a single medium, the machine-readable medium 926 can include multiple media (e.g., a centralized/distributed database and/or associated caches and servers) that store one or more sets of instructions 928. The machine-readable medium 926 can include any medium that is capable of storing, encoding, or carrying a set of instructions for execution by the computer system 900. The machine-readable medium 926 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 910, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 904, 908, 928) set at various times in various memory and storage devices in computing device(s). When read and executed by the processor 902, the instruction(s) cause the computer system 900 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the Detailed Description above using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or subcombinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the Detailed Description above explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

The invention claimed is:

1. One or more tangible, non-transitory, computer-readable storage media excluding transitory signals and carrying instructions, the media comprising instructions recorded thereon, wherein the instructions, when executed by at least one data processor of a computing system, cause the computing system to perform operations for enabling user tuning of artificial intelligence (AI)-generated queries against a block-based data structure comprising a render tree having a set of blocks linked via block properties, the operations comprising:

generating and rendering, at a computing device associated with a particular user, a page comprising a graphical user interface (GUI) comprising a displayable item from a first block from the set of blocks included in the render tree;

generating and binding to the page a schema definition configured to enable data discovery of a subset of blocks in the set of blocks, wherein the subset of blocks is not initially displayed on the page, wherein the subset of blocks is generated using permissions information for the particular user, and wherein the permissions information associates the particular subset of blocks with the first block in the render tree via an upward pointer or a downward pointer;

capturing, via an input control of the GUI, a natural language prompt;

using at least a portion of the natural language prompt, performing operations comprising:

using the at least a portion of the natural language prompt, determining a property of the first block;

cross-referencing the property of the first block, via the schema definition, to a second block in the subset of blocks included in the schema definition; and causing a large language model to generate a query executable against the block-based data structure to return a result set comprising the second block from the block-based data structure;

causing the generated query to be executed against the block-based data structure to generate a result set comprising a displayable item from the second block; and using the result set, generating and displaying, at the GUI, (i) an ephemeral view comprising the result set and (ii) a tuning control configured to enable dynamic tuning of the generated query via the GUI.

2. The one or more tangible, non-transitory, computer-readable media of claim 1, wherein the instructions, when executed by the at least one data processor of the computing system, cause the computing system to perform operations to:

generate additional context using (i) at least an additional portion of the natural language prompt in combination with (ii) a property of the second block;

wherein the query is executable against the block-based data structure to return the result set comprising a third block from the block-based data structure, the third block determined based on the additional context.

3. The one or more tangible, non-transitory, computer-readable media of claim 1, wherein the instructions, when executed by the at least one data processor of the computing system, cause the computing system to perform operations to:

in response to detecting a user interaction with the tuning control, modify the generated query.

4. The one or more tangible, non-transitory, computer-readable media of claim 3, wherein the tuning control is structured to enable a user to interact, via the ephemeral view, with items in the block-based data structure that are not initially visible from the page, the tuning control being operable to set at least one of a property name of the second block, a condition applied to a property of the second block, or a content option for the property of the second block.

5. The one or more tangible, non-transitory, computer-readable media of claim 4, the operations further comprising:

causing a modified query to be executed against the block-based data structure to generate an updated result set for the ephemeral view.

6. The one or more tangible, non-transitory, computer-readable media of claim 4, the operations further comprising:

filtering the ephemeral view based on the user interaction with the tuning control.

7. The one or more tangible, non-transitory, computer-readable media of claim 4, wherein the result set comprises a first item in a first content modality and a second item is in a second content modality different from the first content modality, wherein the first content modality or the second content modality comprises one or more of text, data, a table, an image, an audio item, a video item, a multimedia item, or a digital map; and wherein the tuning control is additionally operable to set: (i) at least one of a first property name of the second block that stores the first item, a first condition applied to a property of the second block, or a first content option for the property of the second block, and (ii) at least one of a second property name of a third block that stores the second item, a second condition applied to a property of the third block, or a second content option for the property of the third block.

8. A computing system comprising at least one data processor and one or more non-transitory, computer-readable storage media excluding transitory signals and carrying instructions, the media having instructions recorded thereon, wherein the instructions, when executed by the at least one data processor of the computing system, cause the computing system to perform operations for enabling user tuning of artificial intelligence (AI)-generated queries against a block-based data structure comprising a render tree having a set of blocks linked via block properties, the operations comprising:

rendering, at a computing device associated with a particular user, a page comprising a graphical user interface (GUI) comprising a displayable item from a first block from the set of blocks included in the render tree;

generating and binding to the page a schema definition configured to enable data discovery of a subset of blocks in the set of blocks, wherein the subset of blocks is not initially displayed on the page, wherein the subset of blocks is generated using permissions information for the particular user, and wherein the permissions information associates the particular subset of blocks with the first block in the render tree via an upward pointer or a downward pointer;

capturing, via an input control of the GUI, a natural language prompt;

using at least a portion of the natural language prompt, performing operations comprising:

using the at least a portion of the natural language prompt, determining a property of the first block;

cross-referencing the property of the first block, via the schema definition, to a second block in the subset of blocks included in the schema definition; and causing a large language model to generate a query executable against the block-based data structure to return a result set comprising the second block from the block-based data structure;

causing the generated query to be executed against the block-based data structure to generate a result set comprising a displayable item from the second block; and using the result set, generating and displaying, at the GUI, (i) an ephemeral view comprising the result set and (ii) a tuning control configured to enable dynamic tuning of the generated query via the GUI.

9. The computing system of claim 8, wherein the instructions, when executed by the at least one data processor of the computing system, cause the computing system to perform operations to:

generate additional context using (i) at least an additional portion of the natural language prompt in combination with (ii) a property of the second block;

wherein the query is executable against the block-based data structure to return the result set comprising a third block from the block-based data structure, the third block determined based on the additional context.

10. The computing system of claim 8, wherein the instructions, when executed by the at least one data processor of the computing system, cause the computing system to perform operations to:

in response to detecting a user interaction with the tuning control, modify the generated query.

11. The computing system of claim 10, wherein the tuning control is structured to enable a user to interact, via the ephemeral view, with items in the block-based data structure that are not initially visible from the page, the tuning control being operable to set at least one of a property name of the second block, a condition applied to a property of the second block, or a content option for the property of the second block.

12. The computing system of claim 11, the operations further comprising:

causing a modified query to be executed against the block-based data structure to generate an updated result set for the ephemeral view.

13. The computing system of claim 11, the operations further comprising:

filtering the ephemeral view based on the user interaction with the tuning control.

14. The computing system of claim 11, wherein the result set comprises a first item in a first content modality and a second item is in a second content modality different from the first content modality, wherein the first content modality or the second content modality comprises one or more of text, data, a table, an image, an audio item, a video item, a multimedia item, or a digital map; and wherein the tuning control is additionally operable to set: (i) at least one of a first property name of the second block that stores the first item, a first condition applied to a property of the second block, or a first content option for the property of the second block, and (ii) at least one of a second property name of a third block that stores the second item, a second condition applied to a property of the third block, or a second content option for the property of the third block.

15. A computer-implemented method, the method comprising:

rendering, at a computing device associated with a particular user, a page comprising a graphical user interface (GUI) comprising a displayable item from a first block from a set of blocks of a render tree included in a block-based data structure, wherein individual ones of blocks in the set of blocks are linked via block properties;

generating and binding to the page a schema definition configured to enable data discovery of a subset of blocks in the set of blocks, wherein the subset of blocks is not initially displayed on the page, and wherein the subset of blocks is generated using permissions information for the particular user, and wherein the permissions information associates the particular subset of blocks with the first block in the render tree via an upward pointer or a downward pointer;

capturing, via an input control of the GUI, a natural language prompt;

using at least a portion of the natural language prompt, performing operations comprising:

using the at least a portion of the natural language prompt, determining a property of the first block;

cross-referencing the property of the first block, via the schema definition, to a second block in the subset of blocks included in the schema definition; and causing a large language model to generate a query executable against the block-based data structure to return a result set comprising the second block from the block-based data structure;

causing the generated query to be executed against the block-based data structure to generate a result set comprising a displayable item from the second block; and using the result set, generating and displaying, at the GUI, (i) an ephemeral view comprising the result set and (ii) a tuning control configured to enable dynamic tuning of the generated query via the GUI.

16. The method of claim 15, further comprising:

generating additional context using (i) at least an additional portion of the natural language prompt in combination with (ii) a property of the second block;

wherein the query is executable against the block-based data structure to return the result set comprising a third block from the block-based data structure, the third block determined based on the additional context.

17. The method of claim 15, further comprising:

in response to detecting a user interaction with the tuning control, modifying the generated query.

18. The method of claim 17, wherein the tuning control is structured to enable a user to interact, via the ephemeral view, with items in the block-based data structure that are not initially visible from the page, the tuning control being operable to set at least one of a property name of the second block, a condition applied to a property of the second block, or a content option for the property of the second block.

19. The method of claim 18, further comprising:

causing a modified query to be executed against the block-based data structure to generate an updated result set for the ephemeral view.

20. The method of claim 18, further comprising:

filtering the ephemeral view based on the user interaction with the tuning control.

* * * * *